US012720481B2

(12) United States Patent
Si et al.

(10) Patent No.: US 12,720,481 B2
(45) Date of Patent: Aug. 25, 2026

(54) POSITIONING MEASUREMENT METHOD, POSITIONING CONFIGURATION METHOD, APPARATUS, AND COMMUNICATION DEVICE

(71) Applicant: VIVO MOBILE COMMUNICATION CO., LTD., Chang'an Dongguan (CN)

(72) Inventors: Ye Si, Chang'an Dongguan (CN); Yuanyuan Wang, Chang'an Dongguan (CN); Qian Yang, Chang'an Dongguan (CN); Xusheng Wei, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 297 days.

(21) Appl. No.: 18/399,669

(22) Filed: Dec. 28, 2023

(65) Prior Publication Data

US 2024/0129893 A1 Apr. 18, 2024

Related U.S. Application Data

(63) Continuation of application No. PCT/CN2022/101140, filed on Jun. 24, 2022.

(30) Foreign Application Priority Data

Jun. 30, 2021 (CN) ......................... 202110736315.2

(51) Int. Cl.

| | |
|---|---|
| ***H04W 64/00*** | (2009.01) |
| ***H04L 5/00*** | (2006.01) |
| ***H04W 24/10*** | (2009.01) |

(52) U.S. Cl.

CPC ......... *H04W 64/006* (2013.01); *H04L 5/0051* (2013.01); *H04W 24/10* (2013.01)

(58) Field of Classification Search

None

See application file for complete search history.

(56) References Cited

U.S. PATENT DOCUMENTS

| | | | |
|---|---|---|---|
| 2017/0048027 A1* | 2/2017 | Reial | H04L 1/1896 |
| 2019/0090168 A1 | 3/2019 | Wichert et al. | |

(Continued)

FOREIGN PATENT DOCUMENTS

| | | |
|---|---|---|
| CN | 107690765 A | 2/2018 |
| CN | 111918303 A | 11/2020 |
| WO | 2021000951 A1 | 1/2021 |

OTHER PUBLICATIONS

OPPO, "On Pre-Configured MG Pattern(s) for NR_MG_enh," 3GPP TSG-RAN WG4 Meeting #99-e, R4-2110064, May 19-27, 2021.

(Continued)

*Primary Examiner* — Frantz Bataille

(74) *Attorney, Agent, or Firm* — Foley & Lardner LLP

(57) ABSTRACT

This application provides a positioning measurement method, a positioning configuration method, an apparatus, and a communication device. The positioning measurement method in embodiments of this application includes: receiving, by a terminal, pre-configured measurement gap information, where a pre-configured measurement gap indicated by the pre-configured measurement gap information is used for positioning measurement; and performing, by the terminal, positioning measurement based on the pre-configured measurement gap.

20 Claims, 6 Drawing Sheets

(56) References Cited

U.S. PATENT DOCUMENTS

2022/0060923 A1 2/2022 Zheng et al.
2022/0330198 A1 10/2022 Ren
2022/0361141 A1* 11/2022 Kumar .................. H04W 4/029

OTHER PUBLICATIONS

CATT, "Discussion on Pre-Configured MG Pattern," EGPP TSG-RAN4 Meeting #99-e, R4-2109098, May 19-27, 2021.
Qualcomm Incorporated, "Motivations for Measurement Gap Enhancements WI in NR R17," 3GPP TSG RAN Meeting #89e, RP-201687, Electronic Meeting, Sep. 14-18, 2020.
Moderator (Intel Corporation), "Email Discussion Summary for [98e][234] NR_MG_Part 2," 3GPP TSG-RAN WG4 Meeting #98-e, R4-2103715, Electronic Meeting, Jan. 25-Feb. 5, 2021.
Vivo, "Views on Pre-Configured MG Patterns," 3GPP TSG-RAN WG4 Meeting #99-e, R4-2109614, Electronic Meeing, May 19-27, 2021.

* cited by examiner

POSITIONING MEASUREMENT METHOD, POSITIONING CONFIGURATION METHOD, APPARATUS, AND COMMUNICATION DEVICE

CROSS-REFERENCE TO RELATED APPLICATIONS

This application is a Bypass Continuation Application of PCT International Application No. PCT/CN2022/101140 filed on Jun. 24, 2022, which claims the priority of Chinese Patent Application No. 202110736315.2 filed in China on Jun. 30, 2021, the entire content of which is hereby incorporated by reference.

TECHNICAL FIELD

The present invention relates to the field of communication technologies, and in particular, to a positioning measurement method, a positioning configuration method, an apparatus, and a communication device.

BACKGROUND

In related technologies, a process of configuring a measurement gap (MG) for positioning measurement and measuring positioning reference signal (PRS) is as follows: A location management function (LMF) sends a PRS configuration (for example, positioning assistance data) to user equipment (UE); the LMF sends a location measurement request message to the UE; after receiving the location measurement request message, the UE send a request to a serving base station to measure a PRS in an MG; the serving base station configures a proper MG for the UE; and the UE performs PRS measurement in the MG based on MG configuration information.

It can be seen that only after receiving the PRS configuration and the positioning measurement request, the UE can request the MG configuration and then the base station performs the MG configuration. Time between sending the MG request and receiving the MG configuration is about 20 ms, which is a very large delay.

SUMMARY

According to a first aspect, a positioning measurement method is provided, including.

- receiving, by a terminal, pre-configured measurement gap information, where a pre-configured measurement gap indicated by the pre-configured measurement gap information is used for positioning measurement; and
- performing, by the terminal, positioning measurement based on the pre-configured measurement gap.

According to a second aspect, a positioning configuration method is provided, including:

- sending, by a first network side device, pre-configured measurement gap information, where a pre-configured measurement gap indicated by the pre-configured measurement gap information is used for positioning measurement.

According to a third aspect, a positioning configuration method is provided, including.

- receiving, by a second network side device, pre-configured measurement gap information, where a pre-configured measurement gap indicated by the pre-configured measurement gap information is used for positioning measurement.

According to a fourth aspect, a positioning measurement apparatus is provided, including.

- a first receiving module, configured to receive pre-configured measurement gap information, where a pre-configured measurement gap indicated by the pre-configured measurement gap information is used for positioning measurement; and
- a first measurement module, configured to perform positioning measurement based on the pre-configured measurement gap.

According to a fifth aspect, a positioning configuration apparatus is provided, including:

- a first sending module, configured to send pre-configured measurement gap information, where a pre-configured measurement gap indicated by the pre-configured measurement gap information is used for positioning measurement.

According to a sixth aspect, a positioning configuration apparatus is provided, including:

- a second receiving module, configured to receive pre-configured measurement gap information, where a pre-configured measurement gap indicated by the pre-configured measurement gap information is used for positioning measurement.

According to a seventh aspect, a terminal is provided. The terminal includes a processor, a memory, and a program or instructions stored in the memory and executable on the processor, where the program or the instructions, when executed by the processor, implement the steps of the method according to the first aspect.

According to an eighth aspect, a terminal is provided, including a processor and a communication interface. The communication interface is configured to receive pre-configured measurement gap information, where a pre-configured measurement gap indicated by the pre-configured measurement gap information is used for positioning measurement. The processor is configured to perform positioning measurement based on the pre-configured measurement gap.

According to a ninth aspect, a network side device is provided. The network side device includes a processor, a memory, and a program or instructions stored in the memory and executable on the processor, where the program or the instructions, when executed by the processor, implement the steps of the method according to the second aspect or the third aspect.

According to a tenth aspect, a network side device is provided, including a processor and a communication interface. The communication interface is configured to send pre-configured measurement gap information, where a pre-configured measurement gap indicated by the pre-configured measurement gap information is used for positioning measurement. Alternatively, the communication interface is configured to receive pre-configured measurement gap information, where a pre-configured measurement gap indicated by the pre-configured measurement gap information is used for positioning measurement.

According to an eleventh aspect, a readable storage medium is provided, where the readable storage medium stores a program or instructions, and the program or the instructions, when executed by a processor, implement the steps of the method according to the first aspect, or implement the steps of the method according to the second aspect, or implement the steps of the method according to the third aspect.

According to a twelfth aspect, a chip is provided, where the chip includes a processor and a communication interface, the communication interface is coupled to the processor, and the processor is configured to run a program or instructions, to implement the method according to the first aspect, or implement the method according to the second aspect, or implement the method according to the third aspect.

According to a thirteenth aspect, a computer program/program product is provided, where the computer program/program product is stored in a storage medium, and the program/program product is executed by at least one processor to implement the steps of the method according to the first aspect, the second aspect, or the third aspect.

DETAILED DESCRIPTION

The technical solutions in embodiments of this application are clearly described below with reference to the accompanying drawings in the embodiments of this application. Apparently, the described embodiments are some rather than all of the embodiments of this application. All other embodiments obtained by a person of ordinary skill in the art based on the embodiments of this application fall within the protection scope of this application.

The specification and claims of this application, and terms “first” and “second” are used to distinguish similar objects, but are not used to describe a specific sequence or order. It is to be understood that the terms termed in this way are interchangeable in a proper case, so that the embodiments of this application can be implemented in other orders than the orders illustrated or described herein. Moreover, the objects distinguished by “first” and “second” are usually of one type, and the quantity of objects is not limited. For example, there may be one or more first objects. In addition, “and/or” in the description and claims represents at least one of connected objects, and the character “I” generally indicates an “or” relationship between associated objects.

It should be noted that the technologies described in embodiments of this application are not limited to a long term evolution (LTE)/LTE-advanced (LTE-A) system, and may be further applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), and other systems. The terms “system” and “network” may be used interchangeably in embodiments of this application. The technology described can be applied to the systems and radio technologies described above, and can also be applied to other systems and radio technologies. The following description describes a new radio (NR) system for illustrative purposes, and NR terminology is used in most of the description below. These technologies are also applicable to applications other than NR system applications, for example, the $6^{th}$ generation (6G) communication system.

Figure 1:
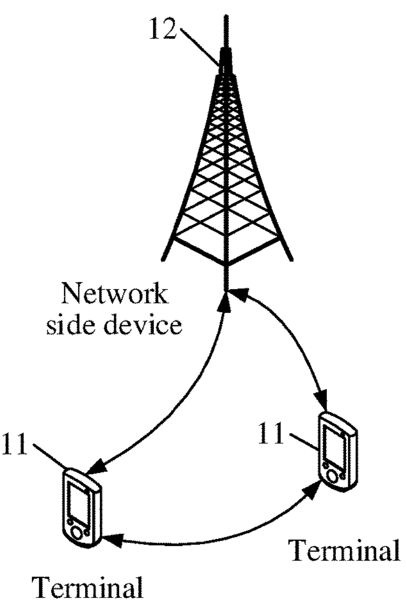
FIG. 1 is a structural diagram of a communication system to which an embodiment of this application can be applied.

FIG. 1 is a structural diagram of a wireless communication system to which an embodiment of this application can be applied. The communication system includes a terminal 11 and a network side device 12. The terminal 11 may be alternatively referred to as a terminal device or user terminal (UE). The terminal 11 may be a terminal side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), an augmented reality (AR)/virtual reality (VR) device, a robot, a wearable device, vehicle user equipment (VUE), pedestrian user equipment (PUE), or smart home (home equipment with wireless communication functions, such as a refrigerator, a TV, a washing machine, or furniture). The wearable device includes: a smart watch, a smart band, smart headphones, smart glasses, smart jewelry (a smart bracelet, a smart bracelet, a smart ring, a smart necklace, a smart anklet, a smart anklet, and the like), a smart wristband, smart clothing, a game console, and the like. It should be noted that in embodiments of this application, a specific type of the terminal 11 is not limited. The network side device 12 may be a base station or a core network device, where the base station may be referred to as a Node B, an evolved Node B, an access point, a base transceiver station (BTS), a radio base station, a radio transceiver, a basic service set (BSS), an extended service set (ESS), a Node B, an evolved Node B (eNB), a Home Node B, a Home evolved Node B, a wireless local area network (WLAN) access point, a wireless fidelity (Wi-Fi) Node, a transmitting receiving point (TRP), or another suitable term in the field. As long as the same technical effect is achieved, the base station is not limited to a specific technical vocabulary. It should be noted that, only a base station in an NR system is used as an example in the embodiments of this application, and the specific type of the base station is not limited.

A positioning measurement method provided in embodiments of this application is described in detail below with reference to the accompanying drawings by using some embodiments and application scenarios.

Figure 2:
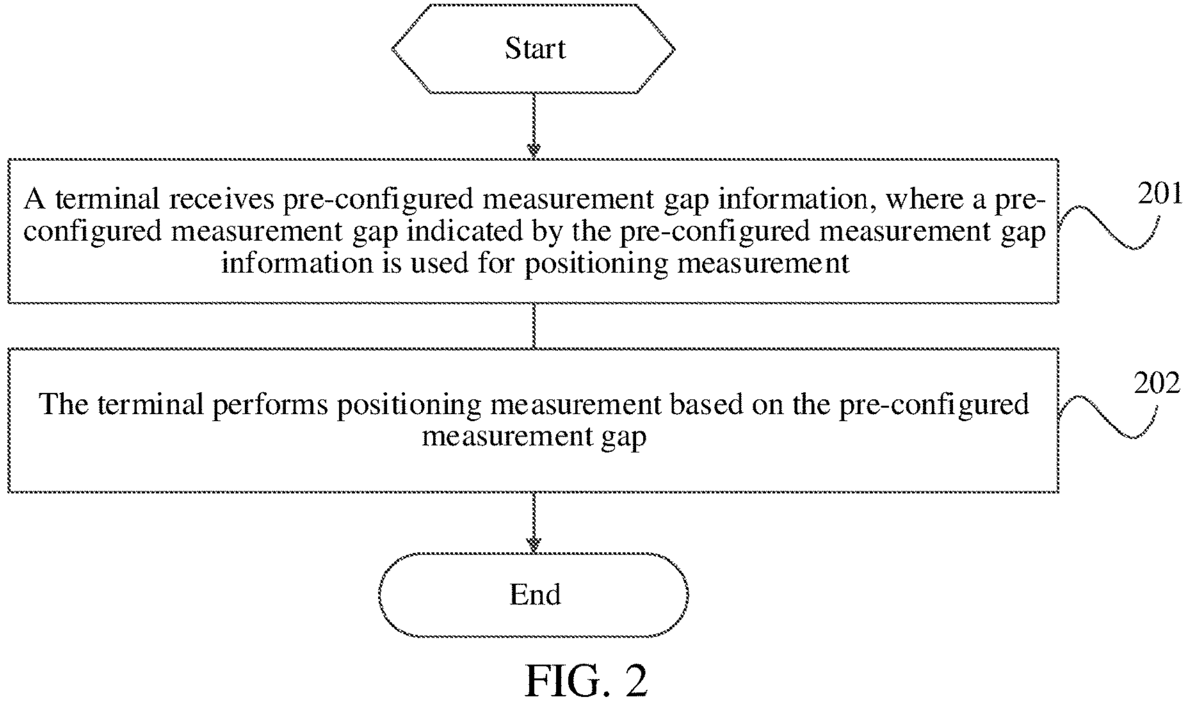
FIG. 2 is a schematic flowchart of a positioning measurement method according to an embodiment of this application.

As shown in FIG. 2, an embodiment of this application provides a positioning measurement method, including:

Step 201: A terminal receives pre-configured measurement gap information, where a pre-configured measurement gap indicated by the pre-configured measurement gap information is used for positioning measurement.

In this step, the terminal receives the pre-configured measurement gap (pre-MG) information sent by the first network side device, to subsequently perform positioning measurement based on the pre-MG indicated by the pre-MG information.

The positioning measurement includes but is not limited to measurement of a PRS, a synchronization signal/physical broadcast channel signal block (SSB), a CSI reference signal (CSI-RS).

Optionally, if an initial status of the pre-MG indicated by the pre-MG information is an activated state, UE assumes that the pre-MG takes effect immediately. In other words, after the UE decodes signaling (for example, radio resource control (RRC)) corresponding to the pre-MG, the pre-MG takes effect immediately. If the initial status of the pre-MG is a deactivated state, the UE assumes that the pre-MG does not take effect immediately, and can determine that the pre-MG takes effect when receiving an activation message or meeting preset event information.

Step 202: The terminal performs positioning measurement based on the pre-configured measurement gap.

The pre-configured measurement gap can be activated when or before the positioning measurement request is received. In this way, time for sending an MG request to a base station for MG configuration after receiving the positioning measurement request is saved, thereby reducing a corresponding delay.

In this embodiment of this application, the pre-configured measurement gap information is received by the terminal. After receiving the positioning measurement request, the terminal can directly perform positioning measurement based on the pre-configured measurement gap indicated by the pre-configured measurement gap information. In this way, time for sending an MG request to a base station for MG configuration after receiving the positioning measurement request is saved, thereby reducing a corresponding delay.

Optionally, the pre-configured measurement gap information includes at least one set of pre-configured measurement gap information, and each set of pre-configured measurement gap information includes at least one of the following:

a pre-configured measurement gap identifier, where the pre-configured measurement gap identifier indicates a type of a measurement gap, the pre-configured measurement gap identifier (for example, a pre-MG flag) is used to distinguish whether the measurement gap is a pre-configured measurement gap or a regular measurement gap, and the regular measurement gap refers to a measurement gap that takes effect immediately after configuration and does not have the activated state or the deactivated state;

a pre-configured measurement gap configuration identifier (for example, a pre-MG configuration ID), where the pre-configured measurement gap configuration identifier represents an identifier corresponding to the set of pre-configured measurement gap configuration information; and optionally, the pre-configured measurement gap configuration identifier can also represent a pre-configured measurement gap configuration information set identifier or measurement gap identifier (for example, a pre-MG ID), or the like;

an identifier of a positioning frequency layer corresponding to a pre-configured measurement gap, for example, an identifier of one or more positioning frequency layers corresponding to the set of pre-configured measurement gaps;

a status of the pre-configured measurement gap, where the status of the pre-configured measurement gap includes the activated state or the deactivated state; optionally, when the initial status of the pre-configured measurement gap is the deactivated state by default (as agreed in a protocol), there is no need to specifically indicate the activated state or the deactivated state; for example, when the pre-configured measurement gap is used for positioning measurement, the initial status of the pre-configured measurement gap is the deactivated state by default; and optionally, the status of the pre-configured measurement gap herein can be understood as the initial status of the pre-configured measurement gap;

information indicating an activation manner of the pre-configured measurement gap, where the activation manner includes explicit activation or implicit activation; and optionally, the activation manner can be agreed through a protocol, for example, a default activation manner is explicit activation or implicit activation;

information indicating a deactivation manner of the pre-configured measurement gap, where the deactivation manner can also be agreed through a protocol;

a valid time of a pre-configured measurement gap configuration (or a valid time of a pre-configured measurement gap), where for example, a valid time length of the pre-configured measurement gap configuration (or a valid timer) is T1; after the UE receives the configuration, the measurement gap configuration is valid within time T1; and after time T1, the measurement gap configuration is no longer valid; for example, the status of the pre-configured measurement gap is the deactivated state, and the valid time of the measurement gap configuration is T1; if the pre-configured measurement gap fails to be activated within time T1, the UE assumes that the pre-configured measurement gap configuration is invalid after time T1 elapses; Optionally, T1 can also act on the status of the pre-configured measurement gap to change from the activated state to the deactivated state; for example, when the status of the pre-configured measurement gap changes from the activated state to the deactivated state, the timing starts; if the pre-configured measurement gap is not activated within time T1, the UE assumes that the pre-configured measurement gap configuration is invalid after time T1; optionally, after the UE receives the pre-configured measurement gap information, after time T1, no matter whether the measurement gap is activated or not, the measurement gap becomes invalid; optionally, the valid time of the pre-configured measurement gap configuration may alternatively be stipulated by a protocol, or indicated by the UE or a location server (for example, indicated in a measurement gap request); after the pre-configured measurement gap configuration becomes invalid, the UE can report information about the configuration failure to a serving gNB or the location server, such as reporting an invalid measurement gap configuration identifier, a reason for the failure, and the like; and after the pre-configured measurement gap configuration becomes invalid, the UE can use a regular measurement gap for positioning measurement (fallback behavior);

a valid area of a pre-configured measurement gap configuration (or a valid area of a pre-configured measurement gap), indicating the valid area of the pre-configured measurement gap configuration, where beyond this valid area, the pre-configured measurement gap configuration becomes invalid; the valid area includes but is not limited to at least one of the following: a cell list, which can be represented by a cell ID such as a physical cell identification (PCI) and an NR cell global identifier (NCGI); a specific area, for example, an area in a cell; an area where a specific reference signal measurement change does not exceed a threshold, for example, when a reference signal received power (RSRP) change of an SSB does not exceed a specific threshold, the UE assumes that the pre-configured measurement gap configuration is valid, otherwise the configuration is invalid; and an area of a current serving cell (or camping cell) of the UE; optionally, the valid area of the pre-configured measurement gap configuration may alternatively be stipulated by a protocol, or indicated by the UE or a location server (for example, indicated in a measurement gap request); and first configuration information of the pre-configured measurement gap, where the first configuration information may include conventional configurations such as a measurement gap periodicity, an offset, and duration; and optionally, a conventional (non-pre-configured) measurement gap configuration may be referred to.

In this embodiment of this application, when the status of the pre-configured measurement gap is the deactivated state, the pre-configured measurement gap information includes the activation manner of the pre-configured measurement gap; and when the status of the pre-configured measurement gap is the activated state, the pre-configured measurement gap information includes the deactivation manner of the pre-configured measurement gap. It should be noted that the activation manner or the deactivation manner may be the same, and may be, for example, both implicit activation manners or explicit activation manners. The explicit activation manner refers to activation through explicit signaling, such as activation through an activation message, where the activation message can be sent through the following signaling, including but not limited to at least one of radio resource control (RRC) signaling, media access control (MAC) unit signaling, downlink control information (DCI), an LTE positioning protocol (LPP), and an NR positioning protocol a (NRPPa). Optionally, the activation message is sent through an LPP message, that is, sent by the second network side device (optionally, the activation message may be carried in the positioning measurement request). The activation message is sent through an NRPPa+RRC/medium access control (MAC) control element (CE)/DCI message, that is, initially sent by the second network side device, and then sent via the first network side device. The activation message is sent through an RRC/MAC CE/DCI message, that is, sent by the first network side device.

The implicit activation manner refers to activation without explicit signaling, and can automatically trigger the activation of the pre-configured measurement gap based on occurrence of specific events (for example, receiving a positioning measurement request).

Optionally, for the at least one set of pre-configured measurement gap configuration information, each set of configuration information corresponds to a different measurement gap. Further, each set of configuration information may correspond to a different positioning reference signal configuration (for example, a different positioning frequency layer, a different positioning reference signal resource set, or a different positioning reference signal periodicity), or a different valid area, or a different positioning reference signal (for example, a PRS or an SSB), or a different positioning requirement (for example, a low delay requirement, or a non-low delay requirement), a different bandwidth part (BWP) (for example, the pre-configured information further includes a BWP identifier), a different carrier (for example, the pre-configured information further includes a carrier identifier, or a serving cell identifier).

Optionally, before the terminal receives the pre-configured measurement gap information, the method further includes:

sending, by the terminal, measurement gap request information, where the measurement gap request information is used for requesting the pre-configured measurement gap information.

Optionally, the measurement gap request information includes one of the following:

a type of a measurement gap, where in this embodiment of this application, the type of the measurement gap includes a pre-configured measurement gap or a regular measurement gap; optionally, a flag indicates the type of the measurement gap, for example, if the flag is 1, it indicates that the type of the measurement gap is a pre-configured measurement gap, and if the flag is 0, it indicates that the type of the measurement gap is a regular measurement gap; the type of the measurement gap in the measurement gap request information may specifically be a pre-configured measurement gap; and optionally, the type of the measurement gap may be represented by the "pre-configured measurement gap identifier" described above;

at least part of positioning reference signal (PRS) configurations, where the PRS configuration is used to assist the first network side device to configure an MG, and the PRS configuration includes at least one of PRS frequency domain location information (for example, including but not limited to a positioning frequency domain layer configuration, bandwidth, a start frequency domain location, and a subcarrier spacing), time domain location information (for example, including but not limited to a PRS periodicity, an offset, and duration), and PRS identification information (for example, including but not limited to a positioning frequency layer identifier, a TRP identifier (for example, a downlink (DL) PRS ID, a PRS resource set identifier, and a PRS resource identifier); optionally, the at least part of positioning reference signal (PRS) configurations correspond to configuration of one or more positioning frequency layers; and the at least part of positioning reference signal (PRS) configurations are used to assist the first network side device to obtain a time-frequency position of the positioning reference signal and assist in configuring the measurement gap;

an activation request indication of a subsequent pre-configured measurement gap, indicating that the first network side device is to receive an activation request of the pre-configured measurement gap subsequently, and can activate the pre-configured measurement gap based on the activation request;

a configuration of a desired measurement gap;

a valid time indication of a pre-configured measurement gap configuration;

a valid area indication of the pre-configured measurement gap configuration; and indication information indicating whether feedback information from a first network side device is required. Optionally, when the measurement gap request information includes indication information indicating that "feedback information is required", the measurement gap request information further includes a content indication that the feedback information required, for example, a pre-MG configuration, to confirm configuration of a pre-MG or reject configuration a pre-MG.

Optionally, when the type of the measurement gap is a pre-configured measurement gap, the measurement gap request information further includes at least one of the following:

a status of the pre-configured measurement gap, where the status of the pre-configured measurement gap includes an activated state or a deactivated state; the first network side device configures the activated or deactivated pre-configured measurement gap for the UE based on the status of the pre-configured measurement gap; optionally, in this embodiment of this application, a default request is made for a deactivated pre-configured measurement gap; in this case, there is no need to include the status of the pre-configured measurement gap in the measurement gap request information; and optionally, the status of the pre-configured measurement gap in the measurement gap request information may be understood as the initial status of the pre-configured measurement gap; and information indicating an activation manner of the pre-configured measurement gap, where the activation manner includes explicit activation or implicit activation. When the pre-configured measurement gap is in the deactivated state, the first network side device activates the pre-configured measurement gap explicitly or implicitly in the activation manner of the pre-configured measurement gap, or the first network side device configures the corresponding activation manner for the UE through the activation manner of the pre-configured measurement gap.

The configuration information related to the pre-configured measurement gap included in the measurement gap request information is the configuration information of the desired pre-configured measurement gap requested by the terminal or the second network side device.

Optionally, that the terminal receives the pre-configured measurement gap information includes:

receiving, by the terminal, first feedback information, where the first feedback information includes the at least one set of pre-configured measurement gap information, and the first feedback information is sent by the first network side device based on the measurement gap request information.

After the terminal sends the measurement gap request information, the first network side device sends first feedback information including the pre-configured measurement gap information based on the measurement gap request information.

It should be noted that when the status of the pre-configured measurement gap in the pre-configured measurement gap information included in the first feedback information is inconsistent with the status of the pre-configured measurement gap in the measurement gap request information, a reason for the inconsistent status is also included. For example, if the status of the requested pre-configured measurement gap is the deactivated state, and the status of the pre-configured measurement gap configured by the first network side device is the activated state, a reason for the inconsistent status is fed back, for example, another measurement requires the status of the pre-configured measurement gap to be the activated state.

Optionally, the first feedback information further includes at least one of the following:

a type of a measurement gap, where the type of the measurement gap includes: a pre-configured measurement gap or a regular measurement gap; and confirmation information or rejection information of a pre-configured measurement gap, where the confirmation information indicates that the requested pre-configured measurement gap can be configured, and the rejection information indicates that the requested pre-configured measurement gap. The confirmation information or the rejection information can be represented by 1 bit, for example, the confirmation information is represented by ack, and the rejection information is represented by nack. Optionally, when the rejection information is included, the reason for rejecting the pre-configured measurement gap may be further included, such as no suitable resources.

Optionally, after sending the measurement gap request information, the method further includes:

obtaining, by the terminal, second feedback information sent by the first network side device, where the second feedback information includes at least one of the following:

a type of a measurement gap, where the type of the measurement gap includes: a pre-configured measurement gap or a regular measurement gap; and confirmation information or rejection information of a pre-configured measurement gap.

The confirmation information or the rejection information in the second feedback information is the same as the confirmation information or the rejection information in the first feedback information, and details are not described herein again.

Optionally, the performing, by the terminal, positioning measurement based on the pre-configured measurement gap includes:

performing positioning measurement within the pre-configured measurement gap when the status of the pre-configured measurement gap is the activated state; or performing positioning measurement within an activated bandwidth part (BWP) when the status of the pre-configured measurement gap is the deactivated state.

Optionally, before the performing, by the terminal, positioning measurement based on the pre-configured measurement gap, the method further includes:

sending, by the terminal, a measurement gap activation request, where the measurement gap activation request is used for requesting to activate the pre-configured measurement gap.

Specifically, a message carrying the measurement gap activation request may be uplink control information (UCI), a MAC CE, or an RRC message.

Optionally, the measurement gap activation request includes at least one of the following:

information indicating an activation manner of the pre-configured measurement gap, for example, indicating explicit activation or implicit activation;

an activation request identifier of the pre-configured measurement gap, where the identifier is for requesting the first network side device to activate the pre-configured measurement a first pre-configured measurement gap configuration identifier, where the first pre-configured measurement gap configuration identifier is for activating a pre-configured measurement gap of a specific configuration; optionally, the location server or the UE pre-obtains the pre-configured measurement gap information, and requests activation, in the activation request, of the pre-configured measurement gap of the specific configuration; and optionally, there may be one or more pre-configured measurement gap configuration identifiers (that is, request to activate one or more pre-configured measurement gaps);

an identifier of a positioning frequency layer, which is used to request activation of a pre-configured measurement gap corresponding to a specific positioning frequency layer;

configuration information of the pre-configured measurement gap, which is used to request activation of a pre-configured measurement gap of a specific configuration, where optionally, the configuration information includes at least one of the following: a measurement gap periodicity, an offset, duration, and the like;

an effective time of the pre-configured measurement gap, where the effective time includes at least one of a start effective time, an end effective time, and effective duration; optionally, the effective time of the pre-configured measurement gap may also be a periodic time window, and may further include at least one of: a periodicity, a periodicity offset, duration of each periodicity, and a quantity of periodicities (where a window of one effective time may include a periodicity of at least one pre-configured measurement gap); the effective time (window) of the pre-configured measurement gap may be equivalent to a measurement time (window) of a PRS; when the terminal or the second network side device sends a request, an indication of the effective time (window) of the pre-configured measurement gap may also be replaced by an indication of a positioning measurement time (window); optionally, the indication of the effective time of the pre-configured measurement gap may also be included in the pre-configured measurement gap request; optionally, the indication of the effective time of the pre-configured measurement gap may also be sent to the terminal, for example, sent by the first network side device (for example, through the pre-configured measurement gap configuration, or the pre-configured measurement gap activation message) or sent by the second network side device. (for example, through an LPP message, such as carried in the positioning measurement request); the first network side device may activate the pre-configured measurement gap within the effective time, that is, the status of the pre-configured measurement gap within the effective time is the activated state, and the status of the pre-configured measurement gap outside the effective time is the deactivated state;

time corresponding to a first PRS occasion and/or a last PRS occasion after the pre-configured measurement gap takes effect, that is, the pre-configured measurement gap starts to be used at the first PRS occasion and/or stops to be used at the last PRS occasion, where optionally, the PRS occasion may also be expressed as a PRS sample, or a PRS periodicity, or a PRS instance; optionally, considering periodic measurement requirements of positioning, the "time corresponding to a first PRS occasion and/or a last PRS occasion after the pre-configured measurement gap takes effect" may also be represented by an indication of a positioning (PRS) measurement time window, where the indication of the positioning measurement time window includes at least one of a periodicity of the measurement window, a periodicity offset, and duration of each periodicity (where a measurement window of one periodicity includes at least one PRS periodicity); optionally, the indication of the PRS occasion or the positioning measurement time window may also be included in the pre-configured measurement gap request; and the first network device may activate a pre-configured measurement gap in a corresponding time (window) based on the PRS occasion or the positioning measurement time window;

an effective time requirement of the pre-configured measurement gap, where the first network side device is required to activate the pre-configured measurement gap within time T after receiving the measurement gap activation request; and indication information indicating whether feedback information from a first network side device is required.

Optionally, the method according to this embodiment of this application further includes:

receiving third feedback information sent by the first network side device based on the measurement gap activation request, where the third feedback information includes at least one of the following:

whether the pre-configured measurement gap is activated; and a first pre-configured measurement gap configuration identifier, where the first pre-configured measurement gap configuration identifier is for activating a pre-configured measurement gap of a specific configuration.

In this embodiment of this application, the pre-configured measurement gap may be activated in an explicit manner, or the pre-configured measurement gap may be activated in an implicit manner.

When the pre-configured measurement gap is activated in the explicit manner, in this embodiment of this application, before the performing, by the terminal, positioning measurement based on the pre-configured measurement gap, the method further includes:

receiving an activation message; and activating the pre-configured measurement gap based on the activation message, where the activation message includes at least one of the following:

an activation identifier; and a first pre-configured measurement gap configuration identifier, where the first pre-configured measurement gap configuration identifier is for activating a pre-configured measurement gap of a specific configuration; and optionally, there are one or more first pre-configured measurement gap configuration identifiers; and a positioning frequency layer identifier, which is used to activate a measurement gap corresponding to a specific positioning frequency layer. Optionally, there are one or more positioning frequency layer identifiers.

The activation message may be sent through one of RRC, a MAC CE, and DCI, for example, through DCI signaling, where a domain of the DCI is "MG activation". Optionally, the deactivation message can also be sent through one of RRC, a MAC CE, and DCI, for example, through DCI signaling, where a domain of the DCI is "MG activation". For example, for deactivation of the pre-configured measurement gap, the DCI domain is "MG deactivation".

Optionally, the activation message may be included in the positioning measurement request. The UE activates a pre-configured measurement gap of a specific configuration based on the pre-configured measurement gap activation information in the positioning measurement request.

When the pre-configured measurement gap is activated in the implicit manner, in this embodiment of this application, before the performing, by the terminal, positioning measurement based on the pre-configured measurement gap, the method further includes:

activating the pre-configured measurement gap based on first event information, where the first event information includes at least one of the following:

a positioning measurement request is received; and an activated downlink bandwidth part BWP (DL active BWP) of the terminal does not match a positioning reference signal (PRS).

In this embodiment of this application, the match between the activated downlink BWP and the PRS means that the frequency domain position of the PRS is within the frequency domain range of the activated downlink BWP, and a parameter set or subcarrier spacing (numerology) of the PRS is the same as that of the activated downlink BWP; otherwise, there is no match.

Optionally, if the network side device indicates the terminal to measure the positioning reference signal within the positioning measurement time window, the first event information further includes: an indication of receiving the positioning measurement time window. The terminal may assume that the status of the pre-configured measurement gap within the positioning measurement time window is the activated state, and the status of the pre-configured measurement gap outside the positioning measurement time window is the deactivated state. Optionally, after the terminal receives the positioning measurement request, the terminal may assume that the status of the pre-configured measurement gap within the positioning measurement time window is the activated state, and the status of the pre-configured measurement gap outside the positioning measurement time window is the deactivated state. Alternatively, after the terminal receives the positioning measurement request, and the activated downlink bandwidth part BWP (DL active BWP) of the terminal does not match the positioning reference signal (PRS), the terminal may assume that the status of the pre-configured measurement gap within the positioning measurement window is the activated state, and the pre-configured measurement gap outside the positioning measurement window is the deactivated state. Optionally, the indication of the positioning measurement time window may be included in the positioning measurement request.

The first event information may be agreed in a protocol, or may be indicated by the network or the UE. The network indication may be a first network side device indication and/or a second network side device indication, and the network indication or the UE indication may include in the measurement gap request information.

Optionally, the first event occurs and the terminal assumes that the pre-configured measurement gap has been activated.

Optionally, during the positioning measurement, the first event information may only include a mismatch between the active downlink bandwidth part BWP (DL active BWP) of the terminal and the positioning reference signal (PRS).

Optionally, when all the conditions in the first event information are met, the terminal assumes that the pre-configured measurement gap has been activated.

The activation of the pre-configured measurement gap performed by the terminal based on the first event information is implicit activation.

Optionally, after the terminal receives the positioning measurement request, it is assumed that the first measurement gap (first MG occasion) after the request signaling (or after a preset time after the request signaling) takes effect; and the preset time may be obtained by at least one of protocol agreement, network indication, or terminal selection.

In addition, in this embodiment of this application, the measurement gap activation request may be sent simultaneously with the positioning measurement request, or may be sent earlier or later than the positioning measurement request. If the measurement gap activation request and the positioning measurement request are sent simultaneously, the measurement gap activation request and the positioning measurement request may be sent using the same signaling. For example, the positioning measurement request may be sent to a serving gNB first, and then sent to the terminal by the serving gNB (or formed by the two parts of signaling). The signaling sent to the serving gNB may include a measurement gap activation request, used to request the serving gNB to activate the pre-configured measurement gap. The positioning measurement request is a request from the second network side device (location server) to the UE for positioning measurements (positioning measurements) or position estimate (position estimate). An information element (IE) in the LTE positioning protocol (LPP protocol) is RequestLocationInformation.

It should be noted that when the pre-configured measurement gap needs to be converted from the activated state to the deactivated state, a deactivation request is sent. For example, if a BWP switch occurs on the terminal and the switched BWP matches the PRS, the deactivation request is sent.

In this embodiment of this application, various descriptions for activation are also applicable to deactivation, for example, there is a pre-configured measurement gap activation request, and there is also a pre-configured measurement gap deactivation request. Optionally, the content in the deactivation request is symmetrical to the content in the activation request. For example, the deactivation request includes at least one of the following:

a deactivation request identifier of the pre-configured measurement gap, indicating that the signaling is for requesting a deactivation pre-configured measurement gap;

a pre-configured measurement gap configuration identifier, where the pre-configured measurement gap configuration identifier is for deactivating a pre-configured measurement gap of a specific configuration;

a positioning frequency layer identifier, which is used to deactivate a pre-configured measurement gap corresponding to a specific positioning frequency layer;

configuration information of a pre-configured measurement gap, used to deactivate a pre-configured measurement gap of a specific configuration;

a deactivation time of the pre-configured measurement gap, indicating absolute or relative time of deactivation of the pre-configured measurement gap;

a deactivation time requirement of the pre-configured measurement gap, where the first network device is required to deactivate the pre-configured measurement gap within time T after receiving the request; and indication information indicating whether feedback information from a first network side device is required.

Optionally, the deactivation manner of the pre-configured measurement gap may include explicit activation or implicit activation.

An implementation of explicit deactivation is as follows: the terminal deactivates the pre-configured measurement gap based on a deactivation message/signaling. The deactivation message/signaling may be carried through at least one message among RRC, MAC CE, DCI, NRPPa, and LPP. The content of the deactivation message/signaling includes at least one of the following: a deactivation identifier, a pre-configured measurement gap configuration identifier (where the pre-configured measurement gap configuration identifier is for deactivating a pre-configured measurement gap of a specific configuration, and optionally, there are one or more first pre-configured measurement gap configuration identifiers), and a positioning frequency layer identifier (used to deactivate a measurement gap corresponding to a specific positioning frequency layer, and optionally, there are one or more positioning frequency layer identifiers). Optionally, the deactivation message is sent through an LPP message, that is, sent by the second network side device. The deactivation message is sent through an NRPPa+RRC/MAC CE/DCI message, that is, initially sent by the second network side device, and then sent via the first network side device. The deactivation message is sent through an RRC/MAC CE/DCI message, that is, sent by the first network side device.

An implementation of implicit deactivation is as follows: the terminal deactivates the pre-configured measurement gap (or assumes that the pre-configured measurement gap is deactivated) based on event information. The event information includes at least one of the following: the active DL BWP of the current UE matches the PRS; the UE receives a positioning measurement end request; and the positioning measurement ends. Optionally, during the positioning measurement, the event information may only include a match between the active downlink bandwidth part BWP (DL active BWP) of the terminal and the positioning reference signal (PRS).

Certainly, the first network side device may alternatively deactivate the pre-configured measurement gap based on the event information. The event information includes at least one of the following: the active DL BWP of the current UE matches the PRS; and a pre-configured measurement gap deactivation request (or a positioning measurement termination request) is received from the terminal or the second network device.

In this embodiment of this application, the pre-configured measurement gap information is received by the terminal. After receiving the positioning measurement request, the terminal can directly perform positioning measurement based on the pre-configured measurement gap indicated by the pre-configured measurement gap information. In this way, time for sending an MG request to a base station for MG configuration after receiving the positioning measurement request is saved, thereby reducing a corresponding delay.

Figures 3, 4:
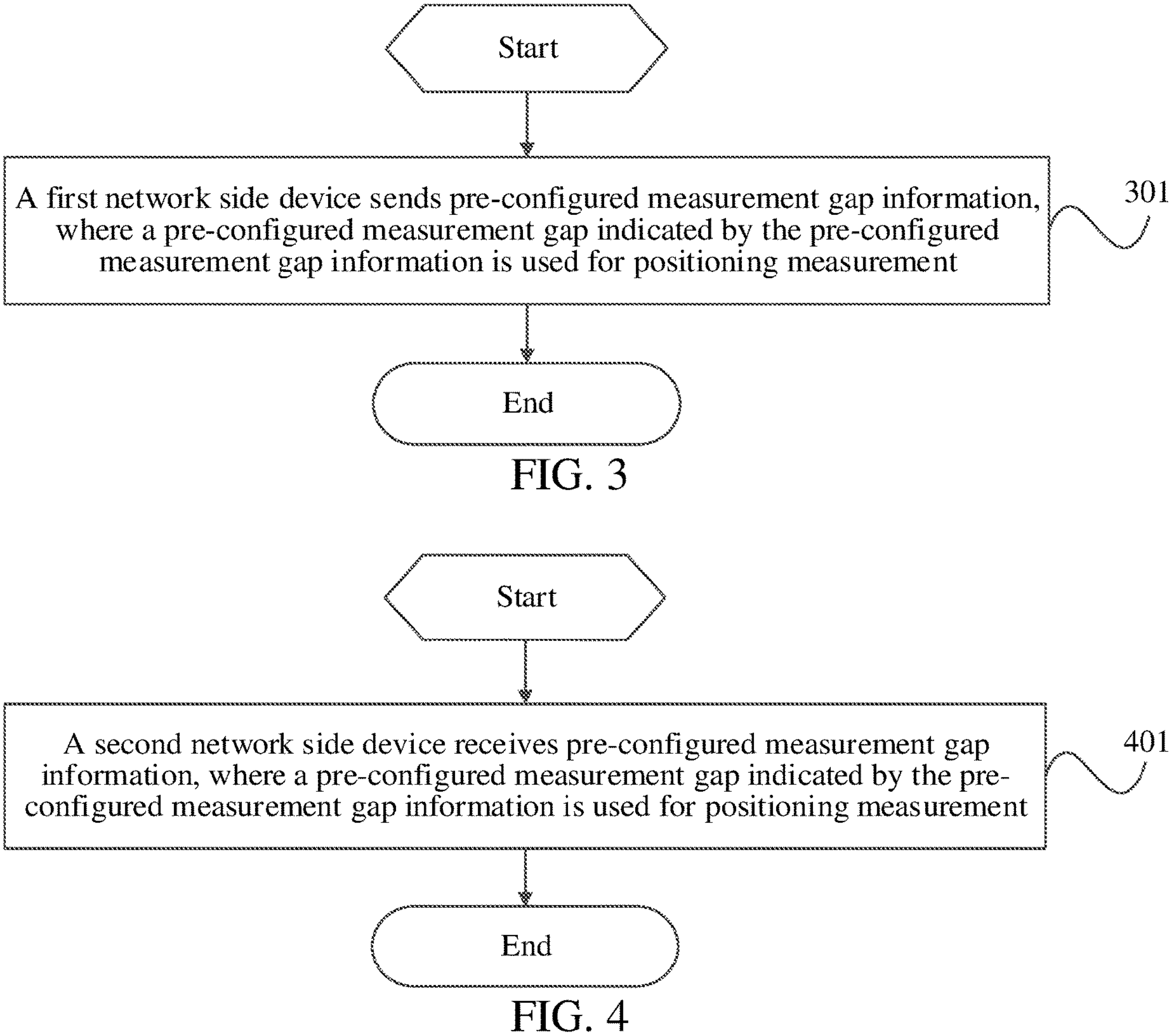
FIG. 3 is a schematic flowchart of a positioning configuration method according to an embodiment of this application.
FIG. 4 is a schematic flowchart of a positioning configuration method according to an embodiment of this application.

As shown in FIG. 3, an embodiment of this application further provides a positioning configuration method, including:

Step 301: A first network side device sends pre-configured measurement gap information, where a pre-configured measurement gap indicated by the pre-configured measurement gap information is used for positioning measurement. The pre-configured measurement gap information may be sent to the terminal or the second network side device.

The first network side device may be specifically a base station. The positioning measurement includes, but is not limited to, measurement of a PRS, an SSB, and/or a CSI-RS.

The second network side device may be a location server. In NR, the location server is a location management function (LMF).

Optionally, if the status of the pre-MG indicated by the pre-MG information is an activated state, UE assumes that the pre-MG takes effect immediately. In other words, after the UE decodes signaling (for example, RRC) corresponding to the pre-MG, the pre-MG takes effect immediately. If the status of the pre-MG is a deactivated state, the UE assumes that the pre-MG does not take effect immediately, and can determine that the pre-MG takes effect when receiving an activation message or meeting preset event information.

In this embodiment of this application, the pre-configured measurement gap information is sent. After receiving the positioning measurement request, the terminal can directly perform positioning measurement based on the pre-configured measurement gap indicated by the pre-configured measurement gap information. In this way, time for sending an MG request to a base station for MG configuration after receiving the positioning measurement request is saved, thereby reducing a corresponding delay.

Optionally, the pre-configured measurement gap information includes at least one set of pre-configured measurement gap information, and each set of pre-configured measurement gap information includes at least one of the following:

- a pre-configured measurement gap identifier, where the pre-configured measurement gap identifier indicates a type of a measurement gap;
- a pre-configured measurement gap configuration identifier;
- an identifier of a positioning frequency layer corresponding to a pre-configured measurement gap;
- a status of the pre-configured measurement gap;
- information indicating an activation manner of the pre-configured measurement gap;
- information indicating a deactivation manner of the pre-configured measurement gap;
- a valid time of a pre-configured measurement gap configuration;
- a valid area of a pre-configured measurement gap configuration; and
- first configuration information of the pre-configured measurement gap.

The pre-configured measurement gap information is the same as the pre-configured measurement gap information on the terminal side, and details are not described herein again.

Optionally, the method according to this embodiment of this application further includes:

obtaining measurement gap request information sent by a second network side device or a terminal, where the measurement gap request information is used for requesting the pre-configured measurement gap information.

Optionally, the measurement gap request information includes one of the following:

- a type of a measurement gap, where the type of the measurement gap includes: a pre-configured measurement gap or a regular measurement gap;
- at least part of positioning reference signal (PRS) configurations;
- an activation request indication of a subsequent pre-configured measurement gap;
- a configuration of a desired measurement gap;
- a valid time indication of a pre-configured measurement gap configuration;
- a valid area indication of the pre-configured measurement gap configuration; and
- indication information indicating whether feedback information from a first network side device is required.

Optionally, when the type of the measurement gap is a pre-configured measurement gap, the measurement gap request information further includes at least one of the following:

a status of the pre-configured measurement gap, where the status of the pre-configured measurement gap includes an activated state or a deactivated state; and information indicating an activation manner of the pre-configured measurement gap, where the activation manner includes explicit activation or implicit activation.

The measurement gap request information in this embodiment of this application is the same as the measurement gap request information on the terminal side, and details are not described herein again.

Optionally, that the first network side device sends the pre-configured measurement gap information includes:

sending, by the first network side device, first feedback information to the second network side device or the terminal based on the measurement gap request information, where the first feedback information includes the pre-configured measurement gap information.

Optionally, the first feedback information further includes at least one of the following:

a type of a measurement gap, where the type of the measurement gap includes: a pre-configured measurement gap or a regular measurement gap; and confirmation information or rejection information of a pre-configured measurement gap.

The first feedback information is the same as the first feedback information on the terminal side, and details are not described herein again.

Optionally, the method according to this embodiment of this application further includes:

sending, by the first network side device, second feedback information to the second network side device or the terminal based on the measurement gap request information, where the second feedback information includes at least one of the following:

a type of a measurement gap, where the type of the measurement gap includes: a pre-configured measurement gap or a regular measurement gap; and confirmation information or rejection information of a pre-configured measurement gap.

Optionally, after sending the pre-configured measurement gap information, the method further includes:

sending, by the first network side device, an activation message when a status of the pre-configured measurement gap needs to be converted from a deactivated state to an activated state, where the activation message is for activating the pre-configured measurement gap.

For example, if the initial status of the pre-configured measurement gap is the deactivated, the activation message is sent after the pre-configured measurement gap information is sent.

Optionally, the sending the activation message includes:

sending, by the first network side device, the activation message based on second event information, where the second event information includes at least one of the following:

a measurement gap activation request from a terminal or a second network side device is received or a positioning measurement request from a second network side device is received; and an activated downlink bandwidth part (BWP) of the terminal does not match a positioning reference signal (PRS).

Optionally, when the second event information is met, it may be determined that the status of the pre-configured measurement gap needs to be changed from the deactivated state to the activated state, and then the first network side device sends an activation message.

When the measurement gap activation request is sent by the second network side device (location server), the message carrying the measurement gap activation request is NRPPa. When the measurement gap activation request is sent by the terminal, the message carrying the measurement gap activation request may be UCI, a MAC CE, or an RRC message.

Optionally, when all conditions in the second event information are met, the gNB activates the pre-configured measurement gap.

The activation of the pre-configured measurement gap performed by the first network device based on the second event information is implicit activation.

In addition, in this embodiment of this application, the measurement gap activation request may be sent simultaneously with the positioning measurement request, or may be sent earlier or later than the positioning measurement request. If the measurement gap activation request and the positioning measurement request are sent simultaneously, the measurement gap activation request and the positioning measurement request may be sent using the same signaling. The positioning measurement request is a request from the second network side device (location server) to the UE for positioning measurements or position estimate. An information element (IE) in the LTE positioning protocol (LPP protocol) is RequestLocationInformation.

The second event information may be agreed in a protocol, or may be indicated by the network or the UE. The network indication may be a first network side device indication and/or a second network side device indication, and the network indication or the UE indication may include in the measurement gap request information.

In this embodiment of this application, the match between the activated downlink BWP and the PRS means that the frequency domain position of the PRS is within the frequency domain range of the activated downlink BWP, and a parameter set (numerology) of the PRS is the same as that of the activated downlink BWP; otherwise, there is no match.

Optionally, the activation message includes at least one of the following:

an activation identifier;

a first pre-configured measurement gap configuration identifier, where the first pre-configured measurement gap configuration identifier is for activating a pre-configured measurement gap of a specific configuration; and optionally, there are one or more first pre-configured measurement gap configuration identifiers; and a positioning frequency layer identifier.

The activation message has been described in detail on the terminal side, and details are not described herein again.

Optionally, the measurement gap activation request or the positioning measurement request includes at least one of the following:

information indicating an activation manner of the pre-configured measurement gap;

an activation request identifier of the pre-configured measurement gap;

a first pre-configured measurement gap configuration identifier, where the first pre-configured measurement gap configuration identifier is for activating a pre-configured measurement gap of a specific configuration;

an effective time of the pre-configured measurement gap;

time corresponding to a first PRS occasion and/or a last PRS occasion after the pre-configured measurement gap takes effect;

an effective time requirement of the pre-configured measurement gap; and indication information indicating whether feedback information from a first network side device is required.

Optionally, the method according to this embodiment of this application further includes:

sending, by the first network side device, third feedback information to the second network side device or the terminal based on the measurement gap activation request or the positioning measurement request, where the third feedback information includes at least one of the following:

whether the pre-configured measurement gap is activated; and a first pre-configured measurement gap configuration identifier, where the first pre-configured measurement gap configuration identifier is for activating a pre-configured measurement gap of a specific configuration.

The first network side device sends the third feedback information to the terminal or the second network side device based on the measurement gap activation request or the positioning measurement request.

In this embodiment of this application, the pre-configured measurement gap information is sent. After receiving the positioning measurement request, the terminal can directly perform positioning measurement based on the pre-configured measurement gap indicated by the pre-configured measurement gap information. In this way, time for sending an MG request to a base station for MG configuration after receiving the positioning measurement request is saved, thereby reducing a corresponding delay.

As shown in FIG. 4, an embodiment of this application further provides a positioning configuration method, including:

Step 401: A second network side device receives pre-configured measurement gap information, where a pre-configured measurement gap indicated by the pre-configured measurement gap information is used for positioning measurement.

The second network side device may be specifically a location server.

In this embodiment of this application, the pre-configured measurement gap information is received by the second network side device, to facilitate subsequent activation of the pre-configured measurement gap information, so that the terminal performs positioning measurement based on the pre-configured measurement gap indicated by the activated pre-configured measurement gap information. In this way, time for sending an MG request to a base station for MG configuration after receiving the positioning measurement request by the terminal is saved, thereby reducing a corresponding delay.

Optionally, the pre-configured measurement gap information includes at least one set of pre-configured measurement gap information, and each set of pre-configured measurement gap information includes at least one of the following:

a pre-configured measurement gap identifier, where the pre-configured measurement gap identifier indicates a type of a measurement gap;

a pre-configured measurement gap configuration identifier;

an identifier of a positioning frequency layer corresponding to a pre-configured measurement gap;

a status of the pre-configured measurement gap;

information indicating an activation manner of the pre-configured measurement information indicating a deactivation manner of the pre-configured measurement gap;

a valid time of a pre-configured measurement gap configuration;

a valid area of a pre-configured measurement gap configuration; and first configuration information of the pre-configured measurement gap.

The pre-configured measurement gap information has been described in detail on the terminal side, and details are not described herein again.

Optionally, before the second network side device receives the pre-configured measurement gap information, the method further includes:

sending, by the second network side device, measurement gap request information, where the measurement gap request information is used for requesting the pre-configured measurement gap information.

Optionally, the measurement gap request information includes one of the following:

a type of a measurement gap, where the type of the measurement gap includes: a pre-configured measurement gap or a regular measurement gap;

at least part of positioning reference signal (PRS) configurations;

an activation request indication of a subsequent pre-configured measurement gap;

a configuration of a desired measurement gap;

a valid time indication of a pre-configured measurement gap configuration;

a valid area indication of the pre-configured measurement gap configuration; and indication information indicating whether feedback information from a first network side device is required.

Optionally, when the type of the measurement gap is a pre-configured measurement gap, the measurement gap request information further includes at least one of the following:

a status of the pre-configured measurement gap, where the status of the pre-configured measurement gap includes an activated state or a deactivated state; and information indicating an activation manner of the pre-configured measurement gap, where the activation manner includes explicit activation or implicit activation.

The measurement gap request information has been described in detail in the method embodiment on the terminal side, and details are not described herein again.

Optionally, that the second network side device receives the pre-configured measurement gap information includes:

receiving, by the second network side device, first feedback information, where the first feedback information includes the pre-configured measurement gap information, and the first feedback information is sent by the first network side device based on the measurement gap request information.

Optionally, the first feedback information further includes at least one of the following:

a type of a measurement gap, where the type of the measurement gap includes: a pre-configured measurement gap or a regular measurement gap; and confirmation information or rejection information of a pre-configured measurement gap.

Optionally, after the sending, by the second network side device, measurement gap request information, the method further includes:

obtaining, by the terminal, second feedback information sent by the first network side device, where the second feedback information includes at least one of the following:

a type of a measurement gap, where the type of the measurement gap includes: a pre-configured measurement gap or a regular measurement gap; and confirmation information or rejection information of a pre-configured measurement gap.

Optionally, after receiving the pre-configured measurement gap information, the method further includes:

sending, by the second network side device, a positioning measurement request or a measurement gap activation request, where the positioning measurement request or the measurement gap activation request is used for requesting to activate the pre-configured measurement gap.

Optionally, the measurement gap activation request or the positioning measurement request includes at least one of the following:

information indicating an activation manner of the pre-configured measurement an activation request identifier of the pre-configured measurement gap;

a first pre-configured measurement gap configuration identifier, where the first pre-configured measurement gap configuration identifier is for activating a pre-configured measurement gap of a specific configuration;

an effective time of the pre-configured measurement gap;

time corresponding to a first PRS occasion and/or a last PRS occasion after the pre-configured measurement gap takes effect;

an effective time requirement of the pre-configured measurement gap; and indication information indicating whether feedback information from a first network side device is required.

Optionally, the method according to this embodiment of this application further includes:

receiving third feedback information sent by the first network side device based on the measurement gap activation request or the positioning measurement request, where the third feedback information includes at least one of the following:

whether the pre-configured measurement gap is activated; and a first pre-configured measurement gap configuration identifier, where the first pre-configured measurement gap configuration identifier is for activating a pre-configured measurement gap of a specific configuration.

According to the method in this embodiment of this application, the pre-configured measurement gap information is received by the second network side device, to facilitate subsequent activation of the pre-configured measurement gap information, so that the terminal performs positioning measurement based on the pre-configured measurement gap indicated by the activated pre-configured measurement gap information. In this way, time for sending an MG request to a base station for MG configuration after receiving the positioning measurement request by the terminal is saved, thereby reducing a corresponding delay.

It should be noted that, for the positioning measurement method provided in embodiments of this application, the execution body may be a positioning measurement apparatus, or a control module in the positioning measurement apparatus for executing the positioning measurement method. In this embodiment of this application, the positioning measurement apparatus provided in embodiments of this application is described by taking the positioning measurement method performed by the positioning measurement apparatus as an example.

Figures 5, 6:
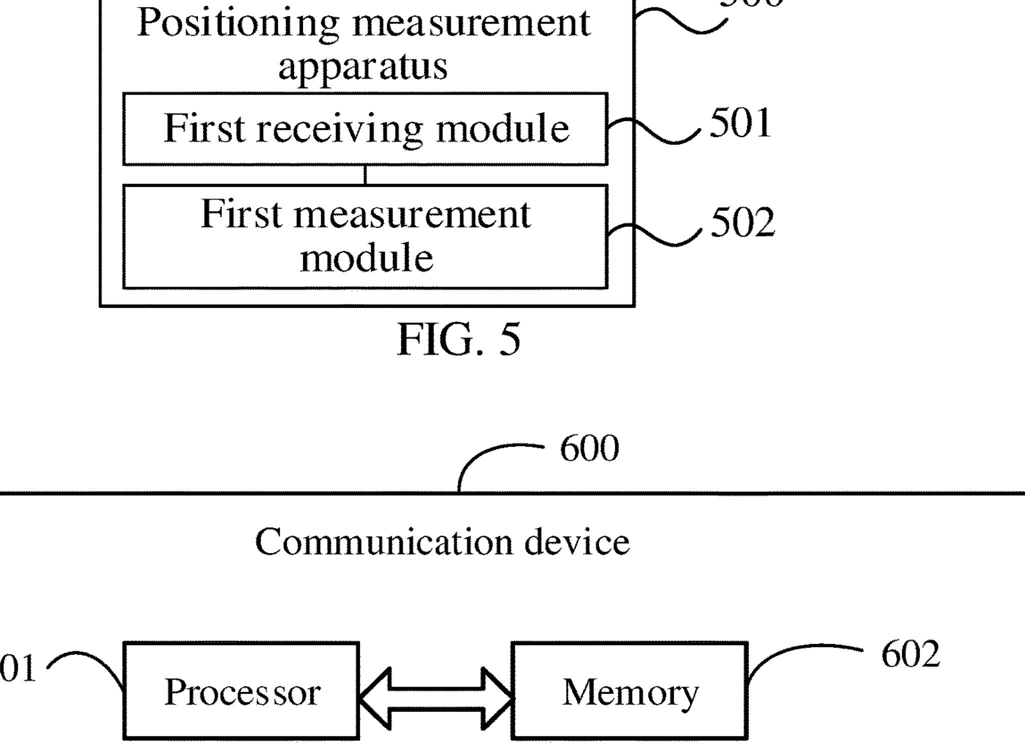
FIG. 5 is a schematic diagram of modules of a positioning measurement apparatus according to an embodiment of this application.
FIG. 6 is a structural block diagram of a communication device according to an embodiment of this application.

As shown in FIG. 5, an embodiment of this application provides a positioning measurement apparatus 500, including:

a first receiving module 501, configured to receive pre-configured measurement gap information, where a pre-configured measurement gap indicated by the pre-configured measurement gap information is used for positioning measurement; and a first measurement module 502, configured to perform positioning measurement based on the pre-configured measurement gap.

Optionally, the pre-configured measurement gap information includes at least one set of pre-configured measurement gap information, and each set of pre-configured measurement gap information includes at least one of the following:

a pre-configured measurement gap identifier, where the pre-configured measurement gap identifier indicates a type of a measurement gap;

a pre-configured measurement gap configuration identifier;

an identifier of a positioning frequency layer corresponding to a pre-configured measurement gap;

a status of the pre-configured measurement gap;

information indicating an activation manner of the pre-configured measurement gap;

information indicating a deactivation manner of the pre-configured measurement gap;

a valid time of a pre-configured measurement gap configuration;

a valid area of a pre-configured measurement gap configuration; and first configuration information of the pre-configured measurement gap.

Optionally, the apparatus according to this embodiment of this application further includes:

a second sending module, configured to send measurement gap request information before the first receiving module receives the pre-configured measurement gap information, where the measurement gap request information is used for requesting the pre-configured measurement gap information.

Optionally, the measurement gap request information includes one of the following:

a type of a measurement gap; and at least part of positioning reference signal (PRS) configurations;

an activation request indication of a subsequent pre-configured measurement gap;

a configuration of a desired measurement gap;

a valid time indication of a pre-configured measurement gap configuration;

a valid area indication of the pre-configured measurement gap configuration; and indication information indicating whether feedback information from a first network side device is required.

Optionally, the first receiving module is configured to receive first feedback information, where the first feedback information includes the pre-configured measurement gap information, and the first feedback information is sent by the first network side device based on the measurement gap request information.

Optionally, the first feedback information further includes at least one of the following:

a type of a measurement gap; and confirmation information or rejection information of a pre-configured measurement gap.

Optionally, the apparatus according to this embodiment of this application further includes:

a first obtaining module, configured to obtain, after the second sending module sends the measurement gap request information, second feedback information sent by a first network side device.

The second feedback information includes at least one of the following:

a type of a measurement gap; and confirmation information or rejection information of a pre-configured measurement gap.

Optionally, the type of the measurement gap includes: a pre-configured measurement gap or a regular measurement gap.

Optionally, when the type of the measurement gap is a pre-configured measurement gap, the measurement gap request information further includes at least one of the following:

a status of the pre-configured measurement gap; and information indicating an activation manner of the pre-configured measurement gap.

Optionally, the status of the pre-configured measurement gap includes an activated state or a deactivated state.

Optionally, the first measurement module is configured to perform positioning measurement within the pre-configured measurement gap when the status of the pre-configured measurement gap is the activated state; or perform positioning measurement within an activated bandwidth part (BWP) when the status of the pre-configured measurement gap is the deactivated state.

Optionally, the apparatus according to this embodiment of this application further includes:

a third sending module, configured to send a measurement gap activation request, where the measurement gap activation request is used for requesting to activate the pre-configured measurement gap.

Optionally, the measurement gap activation request includes at least one of the following:

information indicating an activation manner of the pre-configured measurement gap;

an activation request identifier of the pre-configured measurement gap;

a first pre-configured measurement gap configuration identifier, where the first pre-configured measurement gap configuration identifier is for activating a pre-configured measurement gap of a specific configuration;

an identifier of a positioning frequency layer;

configuration information of the pre-configured measurement gap;

an effective time of the pre-configured measurement gap; time corresponding to a first PRS occasion and/or a last PRS occasion after the pre-configured measurement gap takes effect;

an effective time requirement of the pre-configured measurement gap; and indication information indicating whether feedback information from a first network side device is required.

Optionally, the activation manner includes explicit activation or implicit activation.

Optionally, the apparatus according to this embodiment of this application further includes:

a third receiving module, configured to receive third feedback information sent by the first network side device based on the measurement gap activation request.

The third feedback information includes at least one of the following:

whether the pre-configured measurement gap is activated; and a first pre-configured measurement gap configuration identifier, where the first pre-configured measurement gap configuration identifier is for activating a pre-configured measurement gap of a specific configuration.

Optionally, the apparatus according to this embodiment of this application further includes:

a third receiving module, configured to receive an activation message before the first measurement module performs positioning measurement based on the pre-configured measurement gap; and a first activation module, configured to activate the pre-configured measurement gap based on the activation message.

The activation message includes at least one of the following:

an activation identifier;

a first pre-configured measurement gap configuration identifier, where the first pre-configured measurement gap configuration identifier is for activating a pre-configured measurement gap of a specific configuration; and a positioning frequency layer identifier.

Optionally, the apparatus according to this embodiment of this application further includes:

a second activation module, configured to activate the pre-configured measurement gap based on first event information before the first measurement module performs positioning measurement based on the pre-configured measurement gap.

The first event information includes at least one of the following:

a positioning measurement request is received; and an activated downlink bandwidth part (BWP) of the terminal does not match a positioning reference signal (PRS).

In this embodiment of this application, the pre-configured measurement gap information is received. After receiving the positioning measurement request, the terminal can directly perform positioning measurement based on the pre-configured measurement gap indicated by the pre-configured measurement gap information. In this way, time for sending an MG request to a base station for MG configuration after receiving the positioning measurement request is saved, thereby reducing a corresponding delay.

The positioning measurement apparatus in this embodiment of this application may be an apparatus, an apparatus with an operating system or an electronic device, or may be a component, an integrated circuit, or a chip in a terminal. The apparatus or electronic device may be a mobile terminal or may be a non-mobile terminal. For example, the mobile terminal may include, but is not limited to, the types of the terminal 11 listed above, and the non-mobile terminal may be a server, a network attached storage (NAS), a personal computer (PC), a television (TV), a teller machine, a self-service machine, or the like. This is not specifically limited in this embodiment of this application.

The apparatus provided in embodiments of this application can implement the processes implemented in the method embodiment of FIG. 2, and achieve the same technical effects. To avoid repetition, details are not described herein again.

As shown in FIG. 6, an embodiment of this application further provides a communication device 600, including a processor 601, a memory 602, and a program or instructions stored in the memory 602 and executable on the processor 601. For example, the communication device 600 is a terminal. The program or the instructions, when executed by the processor 601, implement the processes of the embodiments of the positioning measurement method applied to the terminal, and can achieve the same technical effects. When the communication device 600 is a network side device (first network side device or second network side device), the program or the instructions, when executed by the processor 601, implement the processes of the embodiments of the positioning configuration method, and can achieve the same technical effects. To avoid repetition, details are not described herein again.

An embodiment of this application further provides a terminal, including a processor and a communication interface. The communication interface is configured to receive pre-configured measurement gap information, where a pre-configured measurement gap indicated by the pre-configured measurement gap information is used for positioning measurement. The processor is configured to perform positioning measurement based on the pre-configured measurement gap.

Figure 7:
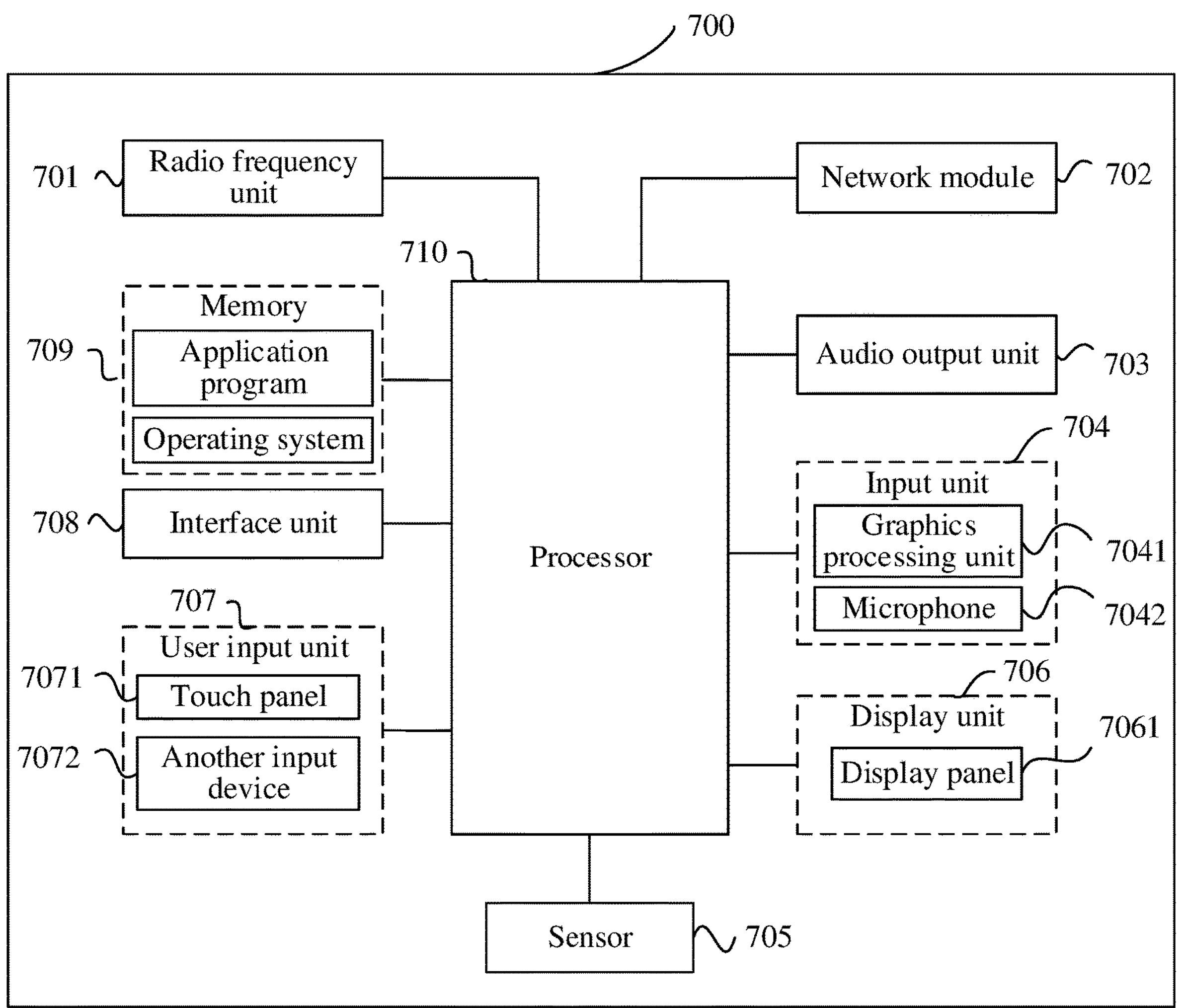
FIG. 7 is a structural block diagram of a terminal according to an embodiment of this application.

This terminal embodiment corresponds to the foregoing terminal-side method embodiment. Each implementation process and implementation manner of the foregoing method embodiment can be applied to this terminal embodiment, and can achieve the same technical effects. Specifically, FIG. 7 is a schematic diagram of a hardware structure of a terminal according to an embodiment of this application. The terminal 700 includes, but is not limited to, at least part of components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include the power supply (for example, a battery) for supplying power to the components. The power supply may be logically connected to the processor 710 by using a power management system, thereby implementing functions such as charging, discharging, and power consumption management by using the power management system. A terminal structure shown in FIG. 7 does not constitute a limitation to the terminal, and the terminal may include more or fewer components than those shown in the figure, or some components may be combined, or a different component deployment may be used. Details are not described herein again.

It should be understood that in embodiments of this application, the input unit 704 may include a graphics processing unit (GPU) 7041 and a microphone 7042, and the graphics processing unit 7041 processes image data of still images or videos obtained by an image capture apparatus (for example, a camera) in a video capture mode or an image capture mode. The display unit 706 may include a display panel 7061, and the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include, but is not limited to, a physical keyboard, a functional key (for example, a volume control key or a switch key), a track ball, a mouse, and a joystick, which are not repeated herein.

In this embodiment of this application, after the radio frequency unit 701 receives downlink data from a network side device, the downlink data is processed by the processor 710. In addition, uplink data is sent to the network side device. Generally, the radio frequency unit 701 includes, but is not limited to, an antenna, at least one amplifier, a transceiver, a coupler, a low noise amplifier, a duplexer, and the like.

The memory 709 may be configured to store software programs or instructions, and various pieces of data. The memory 709 may mainly include a program or instruction storage area and a data storage area. The program or instruction storage area may store an operating system, an application program or instruction required by at least one function (for example, a sound playing function and an image playing function), or the like. In addition, the memory 709 may include a high speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The memory may include, for example, at least one magnetic disk storage device, a flash memory, or other volatile solid-state storage devices.

The processor 710 may include one or more processing units. Optionally, the processor 710 may integrate an application processor and a modem processor. The application processor mainly processes an operating system, a user interface, an application program, instructions, and the like. The modem processor mainly processes wireless communication, and may be, for example, a baseband processor. It may be understood that the foregoing modem processor may not be integrated into the processor 710.

The radio frequency unit 701 is configured to receive pre-configured measurement gap information, where a pre-configured measurement gap indicated by the pre-configured measurement gap information is used for positioning measurement. The processor 710 is configured to perform positioning measurement based on the pre-configured measurement gap.

Optionally, the pre-configured measurement gap information includes at least one set of pre-configured measurement gap information, and each set of pre-configured measurement gap information includes at least one of the following:

a pre-configured measurement gap identifier, where the pre-configured measurement gap identifier indicates a type of a measurement gap;

a pre-configured measurement gap configuration identifier;

an identifier of a positioning frequency layer corresponding to a pre-configured measurement gap;

a status of the pre-configured measurement gap;

information indicating an activation manner of the pre-configured measurement gap;

information indicating a deactivation manner of the pre-configured measurement gap;

a valid time of a pre-configured measurement gap configuration;

a valid area of a pre-configured measurement gap configuration; and first configuration information of the pre-configured measurement gap.

Optionally, before receiving the pre-configured measurement gap information, the radio frequency unit 701 is further configured to:

send measurement gap request information, where the measurement gap request information is used for requesting the pre-configured measurement gap information.

Optionally, the measurement gap request information includes one of the following:

a type of a measurement gap;

at least part of positioning reference signal (PRS) configurations;

an activation request indication of a subsequent pre-configured measurement gap;

a configuration of a desired measurement gap;

a valid time indication of a pre-configured measurement gap configuration;

a valid area indication of the pre-configured measurement gap configuration; and indication information indicating whether feedback information from a first network side device is required.

Optionally, the radio frequency unit 701 is configured to receive first feedback information, where the first feedback information includes the pre-configured measurement gap information, and the first feedback information is sent by the first network side device based on the measurement gap request information.

Optionally, the first feedback information further includes at least one of the following:

a type of a measurement gap; and confirmation information or rejection information of a pre-configured measurement gap.

Optionally, after sending the measurement gap request information, the radio frequency unit 701 is further configured to:

obtain second feedback information sent by the first network side device.

The second feedback information includes at least one of the following:

a type of a measurement gap; and confirmation information or rejection information of a pre-configured measurement gap.

Optionally, the type of the measurement gap includes: a pre-configured measurement gap or a regular measurement gap.

Optionally, when the type of the measurement gap is a pre-configured measurement gap, the measurement gap request information further includes at least one of the following:

a status of the pre-configured measurement gap; and information indicating an activation manner of the pre-configured measurement gap.

Optionally, the status of the pre-configured measurement gap includes an activated state or a deactivated state.

Optionally, the processor 710 is configured to perform positioning measurement within the pre-configured measurement gap when the status of the pre-configured measurement gap is the activated state; or perform positioning measurement within an activated bandwidth part (BWP) when the status of the pre-configured measurement gap is the deactivated state.

Optionally, before the processor 710 performs positioning measurement within the pre-configured measurement gap when the status of the pre-configured measurement gap is the activated state, the radio frequency unit 701 is further configured to send a measurement gap activation request, where the measurement gap activation request is used for requesting to activate the pre-configured measurement gap.

Optionally, the measurement gap activation request includes at least one of the following:

information indicating an activation manner of the pre-configured measurement an activation request identifier of the pre-configured measurement gap;

a first pre-configured measurement gap configuration identifier, where the first pre-configured measurement gap configuration identifier is for activating a pre-configured measurement gap of a specific configuration;

an identifier of a positioning frequency layer;

configuration information of the pre-configured measurement gap;

an effective time of the pre-configured measurement gap;

time corresponding to a first PRS occasion and/or a last PRS occasion after the pre-configured measurement gap takes effect;

an effective time requirement of the pre-configured measurement gap; and indication information indicating whether feedback information from a first network side device is required.

Optionally, the activation manner includes explicit activation or implicit activation.

Optionally, the radio frequency unit 701 is further configured to:

receive third feedback information sent by the first network side device based on the measurement gap activation request.

The third feedback information includes at least one of the following:

whether the pre-configured measurement gap is activated; and a first pre-configured measurement gap configuration identifier, where the first pre-configured measurement gap configuration identifier is for activating a pre-configured measurement gap of a specific configuration.

Optionally, the radio frequency unit 701 is further configured to receive an activation message before positioning measurement is performed based on the pre-configured measurement gap. The processor 710 is configured to activate the pre-configured measurement gap based on the activation message.

The activation message includes at least one of the following:

an activation identifier; and a first pre-configured measurement gap configuration identifier, where the first pre-configured measurement gap configuration identifier is for activating a pre-configured measurement gap of a specific configuration.

The processor 710 is further configured to activate the pre-configured measurement gap based on first event information before positioning measurement is performed based on the pre-configured measurement gap.

The first event information includes at least one of the following:

a positioning measurement request is received; and an activated downlink bandwidth part (BWP) of the terminal does not match a positioning reference signal (PRS).

In this embodiment of this application, the pre-configured measurement gap information is received. After receiving the positioning measurement request, the terminal can directly perform positioning measurement based on the pre-configured measurement gap indicated by the pre-configured measurement gap information. In this way, time for sending an MG request to a base station for MG configuration after receiving the positioning measurement request is saved, thereby reducing a corresponding delay.

It should be noted that, for the positioning configuration method provided in embodiments of this application, the execution body may be a positioning configuration apparatus, or a control module in the positioning configuration apparatus for executing the positioning configuration method. In this embodiment of this application, the positioning configuration apparatus provided in embodiments of this application is described by taking the positioning configuration method performed by the positioning configuration apparatus as an example.

Figure 8:
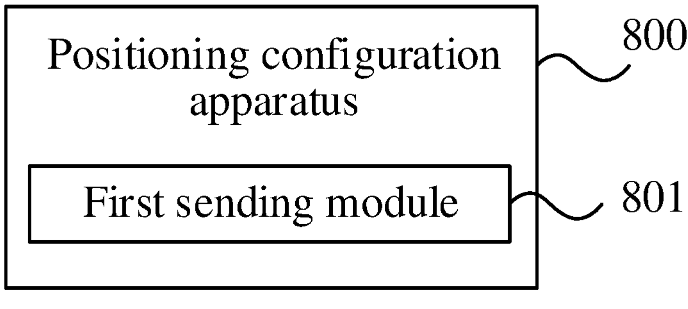
FIG. 8 is a schematic diagram of modules of a positioning configuration apparatus of a first network side device according to an embodiment of this application.

As shown in FIG. 8, an embodiment of this application provides a positioning configuration apparatus 800, including:

a first sending module 801, configured to send pre-configured measurement gap information, where a pre-configured measurement gap indicated by the pre-configured measurement gap information is used for positioning measurement.

Optionally, the positioning configuration apparatus according to this embodiment of this application further includes:

a first determining apparatus, configured to determine pre-configured measurement gap information.

Optionally, the pre-configured measurement gap information includes at least one set of pre-configured measurement gap information, and each set of pre-configured measurement gap information includes at least one of the following:

a pre-configured measurement gap identifier, where the pre-configured measurement gap identifier indicates a type of a measurement gap;

a pre-configured measurement gap configuration identifier;

an identifier of a positioning frequency layer corresponding to a pre-configured measurement gap;

a status of the pre-configured measurement gap;

information indicating an activation manner of the pre-configured measurement gap;

information indicating a deactivation manner of the pre-configured measurement gap;

a valid time of a pre-configured measurement gap configuration;

a valid area of a pre-configured measurement gap configuration; and first configuration information of the pre-configured measurement gap.

Optionally, the apparatus according to this embodiment of this application further includes:

a second obtaining module, configured to obtain measurement gap request information sent by a second network side device or a terminal, where the measurement gap request information is used for requesting the pre-configured measurement gap information.

Optionally, the measurement gap request information includes one of the following:

a type of a measurement gap, where the type of the measurement gap includes: a pre-configured measurement gap or a regular measurement gap;

at least part of positioning reference signal (PRS) configurations;

an activation request indication of a subsequent pre-configured measurement gap;

a configuration of a desired measurement gap;

a valid time indication of a pre-configured measurement gap configuration;

a valid area indication of the pre-configured measurement gap configuration; and indication information indicating whether feedback information from a first network side device is required.

Optionally, the first sending module is configured to send first feedback information to the second network side device or the terminal based on the measurement gap request information, where the first feedback information includes the pre-configured measurement gap information.

Optionally, the first feedback information further includes at least one of the following:

a type of a measurement gap; and confirmation information or rejection information of a pre-configured measurement gap.

Optionally, the apparatus according to this embodiment of this application further includes:

a fourth sending module, configured to send second feedback information to the second network side device or the terminal based on the measurement gap request information.

The second feedback information includes at least one of the following:

a type of a measurement gap; and confirmation information or rejection information of a pre-configured measurement gap.

Optionally, the type of the measurement gap includes: a pre-configured measurement gap or a regular measurement gap.

Optionally, when the type of the measurement gap is a pre-configured measurement gap, the measurement gap request information further includes at least one of the following:

a status of the pre-configured measurement gap; and information indicating an activation manner of the pre-configured measurement gap.

Optionally, the status of the pre-configured measurement gap includes an activated state or a deactivated state.

Optionally, the apparatus according to this embodiment of this application further includes:

a fifth sending module, configured to send, after the first sending module sends the pre-configured measurement gap information, an activation message when a status of the pre-configured measurement gap needs to be converted from a deactivated state to an activated state, where the activation message is for activating the pre-configured measurement gap.

Optionally, the fifth sending module is configured to send the activation message based on second event information.

The second event information includes at least one of the following:

a measurement gap activation request from a terminal or a second network side device is received or a positioning measurement request from a second network side device is received; and an activated downlink bandwidth part (BWP) of the terminal does not match a positioning reference signal (PRS).

Optionally, the activation message includes at least one of the following:

an activation identifier;

a first pre-configured measurement gap configuration identifier, where the first pre-configured measurement gap configuration identifier is for activating a pre-configured measurement gap of a specific configuration; and a positioning frequency layer identifier.

Optionally, the measurement gap activation request or the positioning measurement request includes at least one of the following:

information indicating an activation manner of the pre-configured measurement gap;

an activation request identifier of the pre-configured measurement gap;

a first pre-configured measurement gap configuration identifier, where the first pre-configured measurement gap configuration identifier is for activating a pre-configured measurement gap of a specific configuration;

an effective time of the pre-configured measurement gap;

time corresponding to a first PRS occasion and/or a last PRS occasion after the pre-configured measurement gap takes effect;

an effective time requirement of the pre-configured measurement gap; and indication information indicating whether feedback information from a first network side device is required.

Optionally, the apparatus according to this embodiment of this application further includes:

a sixth sending module, configured to send third feedback information to the second network side device or the terminal based on the measurement gap activation request or the positioning measurement request.

The third feedback information includes at least one of the following:

whether the pre-configured measurement gap is activated; and a first pre-configured measurement gap configuration identifier, where the first pre-configured measurement gap configuration identifier is for activating a pre-configured measurement gap of a specific configuration.

According to the positioning configuration apparatus in this embodiment of this application, the pre-configured measurement gap information is sent. After receiving the positioning measurement request, the terminal can directly perform positioning measurement based on the pre-configured measurement gap indicated by the pre-configured measurement gap information. In this way, time for sending an MG request to a base station for MG configuration after receiving the positioning measurement request is saved, thereby reducing a corresponding delay.

It should be noted that, for the positioning configuration method provided in embodiments of this application, the execution body may be a positioning configuration apparatus, or a control module in the positioning configuration apparatus for executing the positioning configuration method. In this embodiment of this application, the positioning configuration apparatus provided in embodiments of this application is described by taking the positioning configuration method performed by the positioning configuration apparatus as an example.

Figure 9:
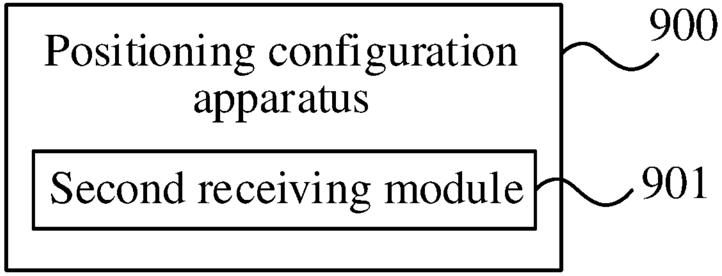
FIG. 9 is a schematic diagram of modules of a positioning configuration apparatus of a second network side device according to an embodiment of this application.

As shown in FIG. 9, an embodiment of this application further provides a positioning configuration apparatus 900, including:

a second receiving module 901, configured to receive pre-configured measurement gap information, where a pre-configured measurement gap indicated by the pre-configured measurement gap information is used for positioning measurement.

Optionally, the pre-configured measurement gap information includes at least one set of pre-configured measurement gap information, and each set of pre-configured measurement gap information includes at least one of the following:

a pre-configured measurement gap identifier, where the pre-configured measurement gap identifier indicates a type of a measurement gap;

a pre-configured measurement gap configuration identifier;

an identifier of a positioning frequency layer corresponding to a pre-configured measurement gap;

a status of the pre-configured measurement gap;

information indicating an activation manner of the pre-configured measurement gap;

information indicating a deactivation manner of the pre-configured measurement gap;

a valid time of a pre-configured measurement gap configuration;

a valid area of a pre-configured measurement gap configuration; and first configuration information of the pre-configured measurement gap.

Optionally, the apparatus according to this embodiment of this application further includes:

a seventh sending module, configured to send measurement gap request information before the second receiving module receives the pre-configured measurement gap information, where the measurement gap request information is used for requesting the pre-configured measurement gap information.

Optionally, the measurement gap request information includes one of the following:

a type of a measurement gap, where the type of the measurement gap includes: a pre-configured measurement gap or a regular measurement gap;

at least part of positioning reference signal (PRS) configurations;

an activation request indication of a subsequent pre-configured measurement gap;

a configuration of a desired measurement gap;

a valid time indication of a pre-configured measurement gap configuration;

a valid area indication of the pre-configured measurement gap configuration; and indication information indicating whether feedback information from a first network side device is required.

Optionally, the second receiving module is configured to receive first feedback information, where the first feedback information includes the pre-configured measurement gap information, and the first feedback information is sent by the first network side device based on the measurement gap request information.

Optionally, the first feedback information further includes at least one of the following:

a type of a measurement gap; and confirmation information or rejection information of a pre-configured measurement gap.

Optionally, the apparatus according to this embodiment of this application further includes:

a third obtaining module, configured to obtain, after the sixth sending module sends the measurement gap request information, second feedback information sent by a first network side device.

The second feedback information includes at least one of the following:

a type of a measurement gap; and confirmation information or rejection information of a pre-configured measurement gap.

Optionally, the type of the measurement gap includes: a pre-configured measurement gap or a regular measurement gap.

Optionally, when the type of the measurement gap is a pre-configured measurement gap, the measurement gap request information further includes at least one of the following:

a status of the pre-configured measurement gap; and information indicating an activation manner of the pre-configured measurement gap.

Optionally, the status of the pre-configured measurement gap includes an activated state or a deactivated state.

Optionally, the apparatus according to this embodiment of this application further includes:

an eighth sending module, configured to send, after the second receiving module receives the pre-configured measurement gap information, a positioning measurement request or a measurement gap activation request, where the positioning measurement request or the measurement gap activation request is used for requesting to activate the pre-configured measurement gap.

Optionally, the measurement gap activation request or the positioning measurement request includes at least one of the following:

information indicating an activation manner of the pre-configured measurement an activation request identifier of the pre-configured measurement gap;

a first pre-configured measurement gap configuration identifier, where the first pre-configured measurement gap configuration identifier is for activating a pre-configured measurement gap of a specific configuration;

an effective time of the pre-configured measurement gap;

time corresponding to a first PRS occasion and/or a last PRS occasion after the pre-configured measurement gap takes effect;

an effective time requirement of the pre-configured measurement gap; and indication information indicating whether feedback information from a first network side device is required.

In this embodiment of this application, the pre-configured measurement gap information is received, to facilitate subsequent activation of the pre-configured measurement gap information, so that the terminal performs positioning measurement based on the pre-configured measurement gap indicated by the activated pre-configured measurement gap information. In this way, time for sending an MG request to a base station for MG configuration after receiving the positioning measurement request by the terminal is saved, thereby reducing a corresponding delay.

An embodiment of this application further provides a network side device, where the network side device may be the foregoing first network side device or second network side device, and the network side device includes a processor and a communication interface. When the network side device is the first network side device, the communication interface is configured to send pre-configured measurement gap information, where a pre-configured measurement gap indicated by the pre-configured measurement gap information is used for positioning measurement. When the network side device is the second network side device, the communication interface is configured to receive pre-configured measurement gap information, where a pre-configured measurement gap indicated by the pre-configured measurement gap information is used for positioning measurement. This network side device embodiment corresponds to the foregoing network side device method embodiment. Each implementation process and implementation of the foregoing method embodiment can be applied to this network side device embodiment, and can achieve the same technical effects.

Figure 10:
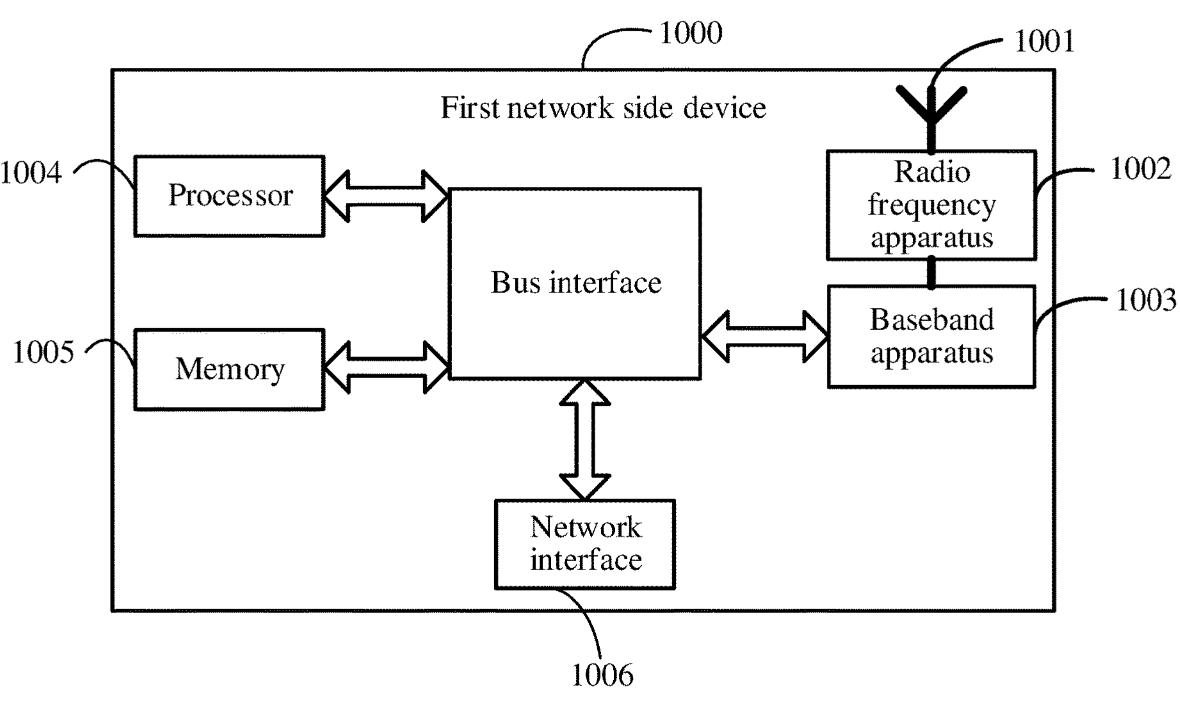
FIG. 10 is a structural block diagram of a first network side device according to an embodiment of this application.

Specifically, an embodiment of this application further provides a network side device. Optionally, the network side device is the foregoing first network side device. As shown in FIG. 10, the network side device 1000 includes: an antenna 1001, a radio frequency apparatus 1002, and a baseband apparatus 1003. The antenna 1001 is connected to the radio frequency apparatus 1002. In an uplink direction, the radio frequency apparatus 1002 receives information by using the antenna 1001, and sends the received information to the baseband apparatus 1003 for processing. In a downlink direction, the baseband apparatus 1003 processes information to be sent, and sends the information to the radio frequency apparatus 1002. The radio frequency apparatus 1002 processes the received information and sends the information by using the antenna 1001.

The frequency band processing apparatus may be located in the baseband apparatus 1003, and the method performed by the network side device in the foregoing embodiment may be implemented in the baseband apparatus 1003, where the baseband apparatus 1003 includes a processor 1004 and a memory 1005.

The baseband apparatus 1003 may include, for example, at least one baseband plate. A plurality of chips are disposed on the baseband plate. As shown in FIG. 10, one of the plurality of chips is, for example, the processor 1004, and is connected to the memory 1005, to invoke a program in the memory 1005 to perform operations of the first network side device in the foregoing method embodiment.

The baseband apparatus 1003 may further include a network interface 1006, configured to exchange information with the radio frequency apparatus 1002. The interface is, for example, a common public radio interface (CPRI).

Specifically, the network side device (first network side device) in embodiments of the present invention further includes: instructions or a program stored in the memory 1005 and runnable on the processor 1004. The processor 1004 invokes the instructions or the program in the memory 1005 to perform the method executed by each module shown in FIG. 8, and achieve the same technical effects. To avoid repetition, details are not repeated herein.

Figure 11:
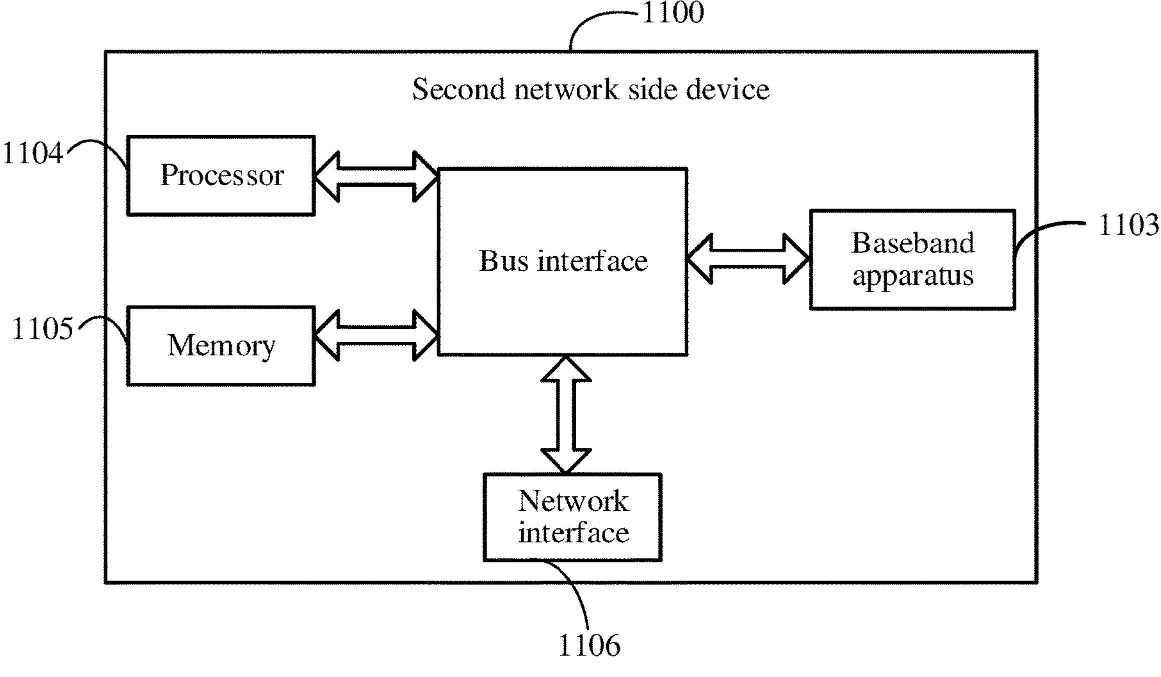
FIG. 11 is a structural block diagram of a second network side device according to an embodiment of this application.

An embodiment of this application further provides a network side device. The network side device may be specifically the foregoing second network side device. As shown in FIG. 11, the network side device 1100 includes a baseband apparatus 1103. The baseband apparatus 1103 processes to be sent information.

The foregoing frequency band processing apparatus may be located in the baseband apparatus 1103, and the method performed by the network side device in the foregoing embodiment may be implemented in the baseband apparatus 1103, where the baseband apparatus 1103 includes a processor 1104 and a memory 1105.

The baseband apparatus 1103 may include, for example, at least one baseband plate. A plurality of chips are disposed on the baseband plate. As shown in FIG. 11, one of the plurality of chips is, for example, the processor 1104, and is connected to the memory 1105, to invoke a program in the memory 1105 to perform operations of the second network side device in the foregoing method embodiment.

The baseband apparatus 1103 may further include a network interface 1106, configured to exchange information with the radio frequency apparatus 1102. The interface is, for example, a common public radio interface (CPRI).

Specifically, the network side device (second network side device) in embodiments of the present invention further includes: instructions or a program stored in the memory 1105 and runnable on the processor 1104. The processor 1104 invokes the instructions or the program in the memory 1105 to perform the method executed by each module shown in FIG. 9, and achieve the same technical effects. To avoid repetition, details are not repeated herein.

An embodiment of this application further provides a readable storage medium. The readable storage medium may be non-volatile or volatile. The readable storage medium stores a program or instructions, where the program or the instructions, when executed by a processor, implement the processes of the embodiments of the foregoing positioning measurement method and positioning configuration method, and achieve the same technical effects, which is not described herein again to avoid repetition.

The processor is the processor in the terminal described in the foregoing embodiment. The readable storage medium includes a computer-readable storage medium, and is, for example, a read-only memory (ROM), a random access memory (Random Access Memory, RAM), a magnetic disk, or an optical disc.

An embodiment of this application further provides a chip, where the chip includes a processor and a communication interface, the communication interface is coupled to the processor, and the processor is configured to run a program or instructions, to implement the processes of the embodiments of the foregoing positioning measurement method and positioning configuration method, and achieve the same technical effects, which is not described herein again to avoid repetition.

It should be understood that, the chip described in this embodiment of this application may also be referred to as a system-level chip, a system chip, a chip system, a system on chip, or the like.

It should be noted that the term “include”, “include” or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence “including one” does not exclude that there are still other same elements in the processes, methods, objects, or apparatuses. Further, it should be noted that the scope of the method and the apparatus in the implementations of this application is not limited to performing the functions in the order shown or discussed, but may further include performing the functions in a substantially simultaneous manner or in the reverse order depending on the functions involved. For example, the described method may be performed in an order different from that described, and various steps may be further added, omitted, or combined. In addition, features described with reference to some examples may be combined in other examples.

Through the descriptions of the foregoing implementations, a person skilled in the art may clearly understand that the methods in the foregoing embodiments may be implemented via software and a necessary general hardware platform, and certainly, may also be implemented by hardware, but in many cases, the former manner is a better implementation. Based on such an understanding, the technical solutions of this application essentially or the part contributing to the prior art may be implemented in a form of a computer software product. The computer software product is stored in a storage medium (for example, a ROM/RAM, a magnetic disk, or an optical disc) and includes several instructions for instructing a terminal (which may be a mobile phone, a computer, a server, a network device, or the like) to perform the method described in the embodiments of this application.

embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A positioning measurement method, comprising:

receiving, by a terminal, pre-configured measurement gap information from a base station, wherein a pre-configured measurement gap indicated by the pre-configured measurement gap information is used for positioning measurement;

receiving, by the terminal, an activation message from the base station through medium access control control element (MAC CE) signaling, wherein the activation message comprises at least one of: an activation identifier or a first pre-configured measurement gap configuration identifier;

activating, by the terminal based on the activation message, the pre-configured measurement gap corresponding to the first pre-configured measurement gap configuration identifier in pre-configured measurement gaps indicated by the pre-configured measurement gap information; and performing, by the terminal, positioning measurement based on the activated pre-configured measurement gap after receiving a positioning measurement request.

2. The method according to claim 1, wherein the pre-configured measurement gap information comprises at least one set of pre-configured measurement gap information, and each set of pre-configured measurement gap information comprises at least one of the following:

a pre-configured measurement gap identifier, wherein the pre-configured measurement gap identifier indicates a type of a measurement gap;

a pre-configured measurement gap configuration identifier;

an identifier of a positioning frequency layer corresponding to the pre-configured measurement gap;

a status of the pre-configured measurement gap;

information indicating an activation manner of the pre-configured measurement gap;

information indicating a deactivation manner of the pre-configured measurement gap;

a valid time of a pre-configured measurement gap configuration;

a valid area of a pre-configured measurement gap configuration; or first configuration information of the pre-configured measurement gap.

3. The method according to claim 1, wherein the performing, by the terminal, positioning measurement based on the activated pre-configured measurement gap after receiving the positioning measurement request comprises:

performing positioning measurement within the pre-configured measurement gap when a status of the activated pre-configured measurement gap is an activated state; or performing positioning measurement within an activated bandwidth part (BWP) when the status of the activated pre-configured measurement gap is a deactivated state.

4. The method according to claim 1, wherein before the performing, by the terminal, positioning measurement based on the activated pre-configured measurement gap after receiving the positioning measurement request, the method further comprises:

sending, by the terminal, a measurement gap activation request through the MAC CE signaling, wherein the measurement gap activation request is used for requesting to activate the pre-configured measurement gap;

wherein the measurement gap activation request comprises at least one of the following:

an activation request identifier of the pre-configured measurement gap; or the first pre-configured measurement gap configuration identifier, wherein the first pre-configured measurement gap configuration identifier is for activating a pre-configured measurement gap of a specific configuration.

5. The method according to claim 3, wherein after sending, by the terminal, the measurement gap deactivation request through the MAC CE signaling, the method further comprises:

receiving, by the terminal, a deactivation message from the base station through the MAC CE signaling; and deactivating, by the terminal, the pre-configured measurement gap based on the deactivation message, wherein the deactivation message comprises at least one of the following:

a deactivation identifier; or a pre-configured measurement gap configuration identifier, wherein the pre-configured measurement gap configuration identifier is for deactivating a pre-configured measurement gap of a specific configuration.

6. A positioning configuration method, comprising:

sending, by a base station, pre-configured measurement gap information to a terminal, wherein a pre-configured measurement gap indicated by the pre-configured measurement gap information is used for positioning measurement; and sending, by the base station, an activation message to the terminal through medium access control control element (MAC CE) signaling, wherein the activation message comprises at least one of: an activation identifier or a first pre-configured measurement gap configuration identifier.

7. The method according to claim 6, wherein the pre-configured measurement gap information comprises at least one set of pre-configured measurement gap information, and each set of pre-configured measurement gap information comprises at least one of the following:

a pre-configured measurement gap identifier, wherein the pre-configured measurement gap identifier indicates a type of a measurement gap;

a pre-configured measurement gap configuration identifier;

an identifier of a positioning frequency layer corresponding to the pre-configured measurement gap;

a status of the pre-configured measurement gap;

information indicating an activation manner of the pre-configured measurement gap;

information indicating a deactivation manner of the pre-configured measurement gap;

a valid time of a pre-configured measurement gap configuration;

a valid area of a pre-configured measurement gap configuration; or first configuration information of the pre-configured measurement gap.

8. The method according to claim 6, further comprising:

obtaining measurement gap request information sent by a location server through a new radio (NR) positioning protocol a message, wherein the measurement gap request information is used for requesting the pre-configured measurement gap information, wherein the measurement gap request information comprises one of the following:

a type of a measurement gap;

at least part of positioning reference signal (PRS) configurations;

an activation request indication of a subsequent pre-configured measurement gap;

a configuration of a desired measurement gap;

a valid time indication of a pre-configured measurement gap configuration;

a valid area indication of the pre-configured measurement gap configuration;

indication information indicating whether feedback information from a base station is required;

wherein when the type of the measurement gap is the pre-configured measurement gap, the measurement gap request information further comprises at least one of the following:

a status of the pre-configured measurement gap, wherein the status of the pre-configured measurement gap comprises an activated state or a deactivated state; or information indicating an activation manner of the pre-configured measurement gap.

9. The method according to claim 6, wherein sending the activation message comprises:

sending, by the base station, the activation message when a measurement gap activation request from the terminal or a location server is received.

10. A positioning configuration method, comprising:

sending, by a location server, measurement gap request information to a base station through a new radio (NR) positioning protocol a message, wherein the measurement gap request information is used for requesting pre-configured measurement gap information.

11. The method according to claim 10, wherein the pre-configured measurement gap information comprises at least one set of pre-configured measurement gap information, and each set of pre-configured measurement gap information comprises at least one of the following:

a pre-configured measurement gap identifier, wherein the pre-configured measurement gap identifier indicates a type of a measurement gap;

a pre-configured measurement gap configuration identifier;

an identifier of a positioning frequency layer corresponding to a pre-configured measurement gap;

a status of the pre-configured measurement gap;

information indicating an activation manner of the pre-configured measurement gap;

information indicating a deactivation manner of the pre-configured measurement gap;

a valid time of a pre-configured measurement gap configuration;

a valid area of a pre-configured measurement gap configuration; or first configuration information of the pre-configured measurement gap.

12. The method according to claim 10, wherein after sending, by the location server, the measurement gap request information, the method further comprises:

receiving, by the location server, feedback information, wherein the feedback information comprises confirmation information of the pre-configured measurement gap.

13. The method according to claim 10, wherein after sending, by the location server, the measurement gap request information to the base station through the NR positioning protocol a message, the method further comprises:

sending, by the location server, a positioning measurement request or a measurement gap activation request, wherein the positioning measurement request or the measurement gap activation request is used for requesting to activate the pre-configured measurement gap;

wherein the measurement gap activation request or the positioning measurement request comprises at least one of the following:

information indicating an activation manner of the pre-configured measurement gap;

an activation request identifier of the pre-configured measurement gap;

a first pre-configured measurement gap configuration identifier, wherein the first pre-configured measurement gap configuration identifier is for activating a pre-configured measurement gap of a specific configuration;

an effective time of the pre-configured measurement gap;

time corresponding to a first PRS occasion and/or a last PRS occasion after the pre-configured measurement gap takes effect;

an effective time requirement of the pre-configured measurement gap; or indication information indicating whether feedback information from a first network side device is required.

14. A terminal, comprising a processor, a memory, and a program or instructions stored in the memory and executable on the processor, wherein the program or the instructions, when being executed by the processor, implement the steps of the positioning measurement method according to claim 1.

15. A network side device, comprising a processor, a memory, and a program or instructions stored in the memory and executable on the processor, wherein the program or the instructions, when being executed by the processor, implement the steps of the positioning configuration method according to claim 6.

16. A network side device, comprising a processor, a memory, and a program or instructions stored in the memory and executable on the processor, wherein the program or the instructions, when being executed by the processor, implement the steps of the positioning configuration method according to claim 10.

17. The method according to claim 1, wherein after receiving, by the terminal, the pre-configured measurement gap information from the base station, the method further comprises:

sending, by the terminal, a measurement gap deactivation request through the MAC CE signaling, wherein the measurement gap deactivation request is used for deactivating the pre-configured measurement gap, wherein the measurement gap deactivation request comprises at least one of:

a deactivation request identifier of the pre-configured measurement gap; or a pre-configured measurement gap configuration identifier, where the pre-configured measurement gap configuration identifier is used for deactivating a pre-configured measurement gap of a specific configuration.

18. The method according to claim 6, further comprising:

sending, by the base station, a deactivation message to the terminal through the MAC CE signaling, wherein the deactivation message comprises at least one of the following:

a deactivation identifier; or a pre-configured measurement gap configuration identifier, wherein the pre-configured measurement gap configuration identifier is for deactivating a pre-configured measurement gap of a specific configuration.

19. The method according to claim 9, wherein the measurement gap activation request from the terminal is used for requesting to activate the pre-configured measurement gap;

wherein the measurement gap activation request comprises at least one of the following:

an activation request identifier of the pre-configured measurement gap; or the first pre-configured measurement gap configuration identifier, wherein the first pre-configured measurement gap configuration identifier is for activating a pre-configured measurement gap of a specific configuration.

20. The method according to claim 12, wherein the feedback information is sent from the base station according to the measurement gap request information.

* * * * *